(12) United States Patent
Xu et al.

(10) Patent No.: US 11,053,441 B2
(45) Date of Patent: Jul. 6, 2021

(54) LIQUID CRYSTAL COMPOSITION AND LIQUID CRYSTAL DISPLAY DEVICE

(71) Applicant: Jiangsu Hecheng Display Technology Co., Ltd., Yangzhong (CN)

(72) Inventors: Haibin Xu, Yangzhong (CN); Wenming Han, Yangzhong (CN)

(73) Assignee: Jiangsu Hecheng Display Technology Co., Ltd., Yangzhong (CN)

(*) Notice: Subject to any disclaimer, the term of this patent is extended or adjusted under 35 U.S.C. 154(b) by 65 days.

(21) Appl. No.: 16/325,240

(22) PCT Filed: Aug. 4, 2017

(86) PCT No.: PCT/CN2017/095927
§ 371 (c)(1),
(2) Date: Feb. 13, 2019

(87) PCT Pub. No.: WO2018/032985
PCT Pub. Date: Feb. 22, 2018

(65) Prior Publication Data
US 2020/0123443 A1    Apr. 23, 2020

(30) Foreign Application Priority Data
Aug. 15, 2016   (CN) .......................... 201610671306.9

(51) Int. Cl.
| C09K 19/30 | (2006.01) |
| C09K 19/12 | (2006.01) |
| C09K 19/20 | (2006.01) |
| C09K 19/32 | (2006.01) |
| C09K 19/34 | (2006.01) |

(52) U.S. Cl.
CPC .......... *C09K 19/3066* (2013.01); *C09K 19/12* (2013.01); *C09K 19/20* (2013.01); *C09K 19/3003* (2013.01); *C09K 19/32* (2013.01); *C09K 19/3402* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3021* (2013.01); *C09K 2019/3025* (2013.01); *C09K 2019/3422* (2013.01)

(58) Field of Classification Search
CPC ....................................................... C09K 19/00
See application file for complete search history.

(56) References Cited

U.S. PATENT DOCUMENTS

| 8,349,414 | B2 | 1/2013 | Yanai et al. |
| 8,968,598 | B2 | 3/2015 | Saito et al. |
| 9,200,202 | B2 | 12/2015 | Kawamura et al. |
| 9,382,479 | B2 | 7/2016 | Yanai et al. |
| 9,688,915 | B2 | 6/2017 | Furusato et al. |
| 9,695,361 | B2 | 7/2017 | Kawamura et al. |
| 10,053,425 | B2 | 8/2018 | Gotoh et al. |
| 10,081,765 | B2 | 9/2018 | Hirschmann et al. |
| 2016/0032188 | A1 | 2/2016 | Furusato et al. |
| 2017/0096602 | A1* | 4/2017 | Hong ............... C09K 19/20 |
| 2017/0210986 | A1 | 7/2017 | Ogawa et al. |
| 2017/0233654 | A1* | 8/2017 | Wang ............ C09K 19/3402 252/299.61 |
| 2017/0298277 | A1 | 10/2017 | Furusato et al. |

FOREIGN PATENT DOCUMENTS

| CN | 103987810 A | | 8/2014 |
| CN | 104039926 A | | 9/2014 |
| CN | 104066815 A | | 9/2014 |
| CN | 104845641 A | | 8/2015 |
| CN | 105308153 A | | 2/2016 |
| CN | 105505405 A | * | 4/2016 |
| CN | 105505405 A | | 4/2016 |
| CN | 105586057 A | | 5/2016 |
| CN | 105586057 A | * | 5/2016 |
| DE | 19528106 A1 | | 8/1996 |
| DE | 19528107 A1 | | 9/1996 |
| EP | 0673986 A2 | | 9/1995 |

(Continued)

*Primary Examiner* — Chanceity N Robinson
(74) *Attorney, Agent, or Firm* — Hoffmann & Baron, LLP

(57) ABSTRACT

A liquid crystal composition and the use thereof are provided. The liquid crystal composition comprises 15-30% by weight of three or more compounds of general formula I; the general formula I must comprises at least two compounds of general formula I-1; wherein, by weight of the total amount of the liquid crystal composition, the total amount of the compounds of general formula I-1 is no lower than 10%, and the content of each of the compounds of general formula I-1 is no higher than 8%. The liquid crystal composition has appropriately high optical anisotropy, higher dielectric anisotropy, lower threshold voltage, suitable elastic constant, suitable temperature range of nematic phase, good reliability and heat stability, and good low-temperature intersolubility.

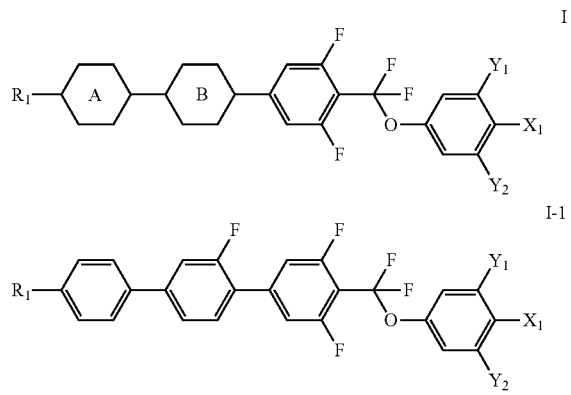

12 Claims, No Drawings

(56) References Cited

FOREIGN PATENT DOCUMENTS

| | | | |
|---|---|---|---|
| EP | 2757139 A1 | 7/2014 | |
| JP | 2014-037523 A | 2/2014 | |
| JP | 2014185315 A * | 10/2014 | |
| KR | 2011-0074880 A | 7/2011 | |
| TW | 201418429 A | 5/2014 | |
| WO | 97/32942 A1 | 9/1997 | |
| WO | WO 2014/141438 A1 | 9/2014 | |
| WO | WO-2015199390 A1 * | 12/2015 | ............. C09K 19/12 |
| WO | WO-2016062209 A1 * | 4/2016 | ............. C09K 19/32 |
| WO | WO 2015/076077 A1 | 3/2017 | |
| WO | WO 2016/017570 A1 | 4/2017 | |
| WO | WO 2016/047249 A1 | 6/2017 | |

* cited by examiner

LIQUID CRYSTAL COMPOSITION AND LIQUID CRYSTAL DISPLAY DEVICE

CROSS-REFERENCE TO RELATED APPLICATIONS

This application is the National Stage of International Application No. PCT/CN2017/095927, filed Aug. 4, 2017, which claims the benefit of Chinese Application No. CN 201610671306.9, filed Aug. 15, 2016, the contents of which is incorporated by reference herein.

TECHNICAL FIELD

The present invention relates to a liquid crystal composition, in particular to a liquid crystal composition having appropriately high optical anisotropy, higher dielectric anisotropy, lower threshold voltage, suitable temperature range of nematic phase, good reliability and heat stability, and good low-temperature intersolubility. The present invention also relates to the use of the liquid crystal composition in the liquid crystal display device.

BACKGROUND ARTS

Liquid crystal material is a mixture of organic rod-shaped small molecular compounds which has both liquid fluidity and anisotropy of crystal at a certain temperature. Because of its characteristics of optical anisotropy and dielectric anisotropy, liquid crystal material is widely used in the liquid crystal display elements of the devices of electronic calculators, car dashboard, televisions, computers and the like.

Based on the phase-transition temperature, the liquid crystal material can be classified into room-temperature liquid crystal (phase-transition temperature range: −10° C.~60° C.) and wide-temperature liquid crystal (phase-transition temperature range: −20° C.~70° C.), and liquid crystal displays manufactured by liquid crystal materials of different phase-transition temperatures have different application locations. As the application range of liquid crystal display devices continues to expand, people have put forward higher requirements on the operating temperature range of the device to adapt to various harsh usage environments. In order to expand the working range of liquid crystal displays, it is needed for liquid crystal display materials to have a wide temperature range of nematic phase so as to meet the requirements for maintaining good display in various environments.

For the liquid crystal display elements, based on the displaying mode of the liquid crystal, it can be classified into the types of PC (phase change), TN (twist nematic), STN (super twisted nematic), ECB (electrically controlled birefringence), OCB (optically compensated bend), IPS (in-plane switching), VA (vertical alignment) and the like. Based on the type of the light source, the liquid crystal display element is classified into a reflection type utilizing natural light, a transmission type utilizing backlight, and a semi-transmission type utilizing both natural light and backlight.

For liquid crystal displays, liquid crystal compounds and liquid crystal media having characteristics, such as good chemical and thermal stabilities, good stabilities against electric field and electromagnetic radiation, and appropriate optical anisotropy, meet the current requirements. Since the liquid crystal material is normally used as a mixture of various components, it is especially important that these components are miscible with each other. According to different battery types and application fields, liquid crystals must meet different requirements, such as response speed, dielectric anisotropy and optical anisotropy and the like. For example, the threshold voltage of the liquid crystal can be reduced and the electric power can be further reduced if the liquid crystal composition has low viscosity.

However, a disadvantage that is significantly present in the prior art (e.g., EP0673986, DE19528106, DE19528107, etc.) is lower resistivity and excessive operating voltage, etc. Additionally, poorer low-temperature storage stability is also a defect of many existing liquid crystal materials, such as WO9732942A1.

When there are issues such as smaller dielectric anisotropy, poorer reliability and the low-temperature stability in the prior art, the present invention focus on preparing liquid crystal composition with appropriately high optical anisotropy, lower threshold voltage, suitable temperature range of nematic phase, higher dielectric anisotropy, good reliability and heat stability, and good low-temperature intersolubility, solving the limitations in the prior art, and expanding the application fields of the liquid crystal composition under the premise of satisfying various indexes of the liquid crystal material.

SUMMARY OF THE INVENTION

The object of the present invention is to provide a liquid crystal composition, which has higher dielectric anisotropy, good reliability and heat stability, and good low-temperature intersolubility on the basis of satisfying appropriately high optical anisotropy, lower threshold voltage, suitable elastic constant and suitable temperature range of nematic phase. The liquid crystal display including the liquid crystal composition has performances such as good reliability and low-temperature storage performance, can still be well displayed in a harsh environment, and has a characteristic of low driving voltage.

The technical solution employed by the present invention is to provide a liquid crystal composition comprising:

three or more compounds of general formula I

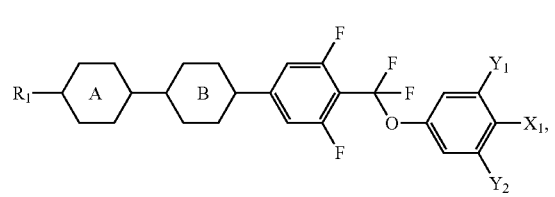

in which, $R_1$ represents $C_{1-5}$ alkyl or alkoxy, or $C_{2-5}$ alkenyl or alkenoxy;

$Y_1$ and $Y_2$ are same or different, and each independently represents H, F, or methyl or methoxyl which is with or without halogen substituent;

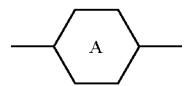

is selected from a group consisting of

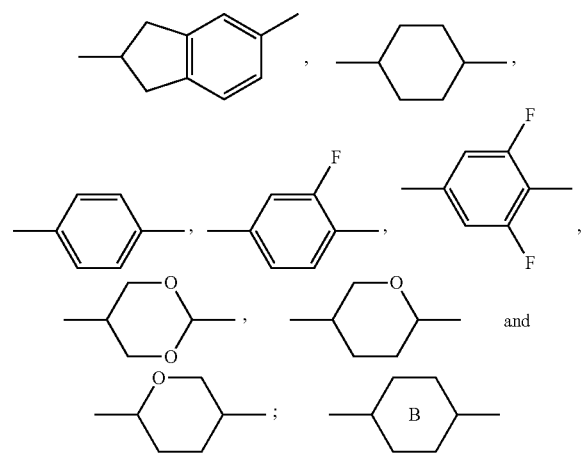

is selected from a group consisting of

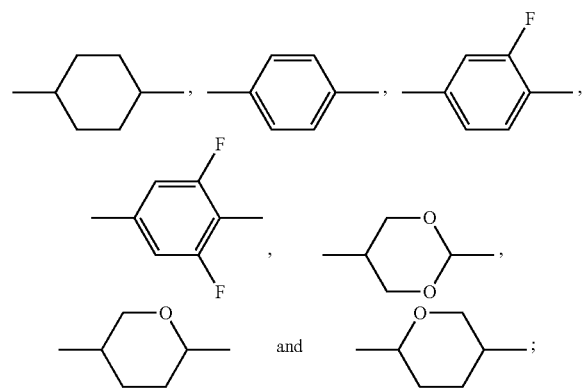

$X_1$ represents F, Cl, or $C_{1-5}$ alkyl or alkoxy which is with or without halogen substituent.

In an embodiment of the present invention, the three or more compounds of general formula I comprise 15-30% by weight of the total amount of the liquid crystal composition.

In an embodiment of the present invention, the three or more compounds of general formula I comprise at least two compounds of general formula I-1,

I-1

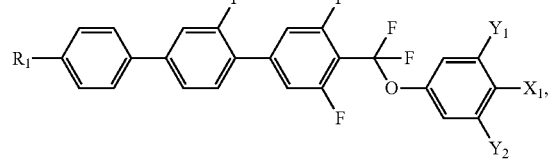

$R_1$, $Y_1$, $Y_2$ and $X_1$ are as defined in general formula I; wherein the total amount of the at least two compounds of general formula I-1 comprise no lower than 10% by weight of the total amount of the liquid crystal composition, and wherein the content of each of the compounds of general formula I-1 is no higher than 8%.

In an embodiment of the present invention, the structure and content of the compound of general formula I-1 are adjusted such that the liquid crystal composition including such a liquid crystal compound has good low-temperature storage stability.

In an embodiment of the present invention, it is preferred that the $R_1$ represents $C_{1-5}$ alkyl, $Y_1$, $Y_2$ and $Y_3$ are same or different, and each independently is H or F; $X_1$ represents F, $CF_3$ or $OCF_3$.

In some embodiments of the present invention, it is preferred that the compound of general formula I-1 is selected from a group consisting of the following compounds:

I-1-1

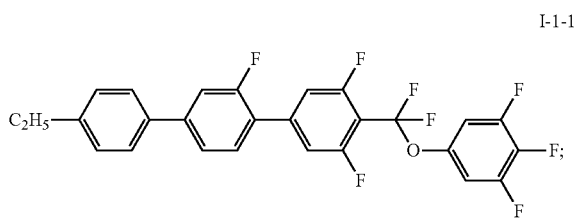

I-1-2

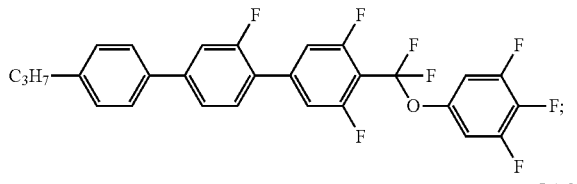

I-1-3

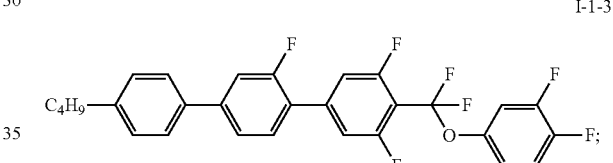

I-1-4

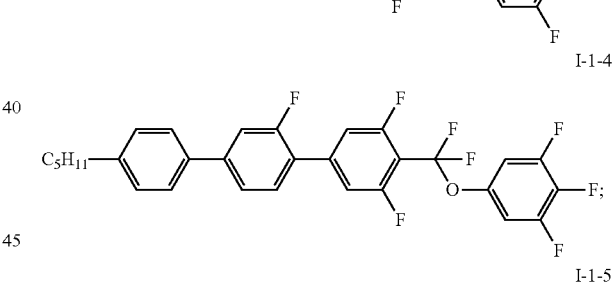

I-1-5

I-1-6

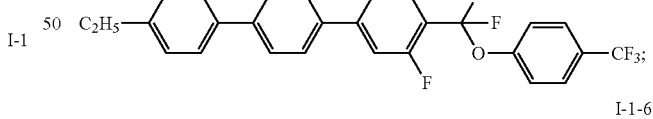

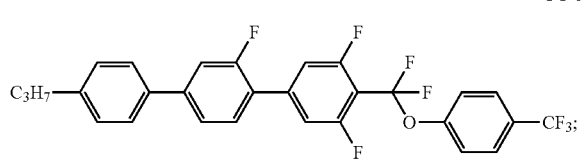

I-1-7

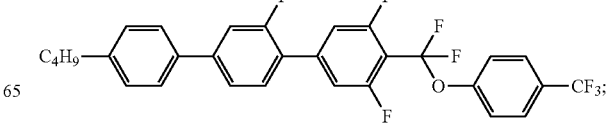

-continued

I-1-8
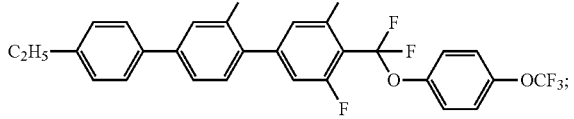

I-1-9
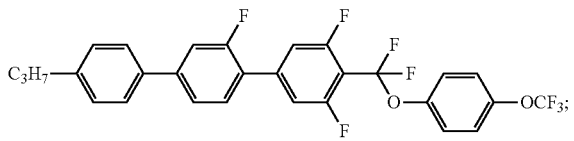

I-1-10
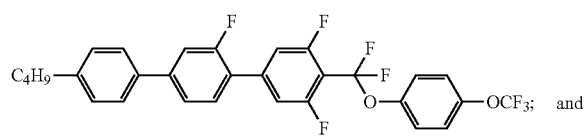
and

I-1-11
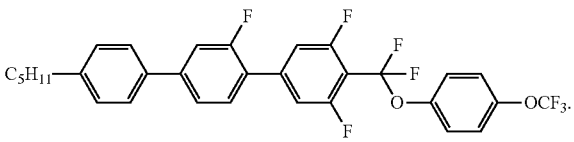

In an embodiment of the present invention, the three or more compounds of general formula I optionally further comprise:

0-15% by weight of the total amount of the liquid crystal composition of one or more compounds of general formula I-2

I-2
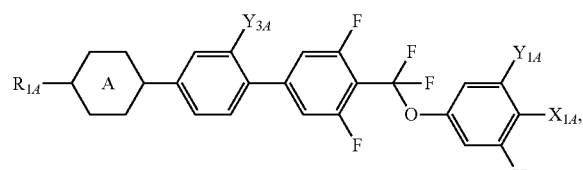

in which, $R_{1A}$ represents $C_{1-5}$ alkyl or alkoxy, or $C_{2-5}$ alkenyl or alkenoxy;

$Y_{1A}$ and $Y_{2A}$ are same or different, and each independently represents H, F, or methyl or methoxyl which is with or without halogen substituent;

$Y_{3A}$ represents H or F;

is selected from a group consisting of

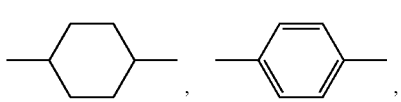

-continued

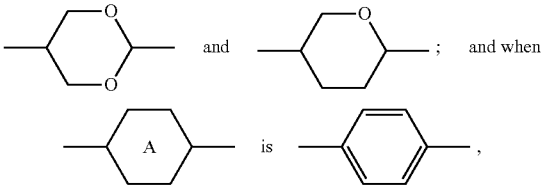

and when

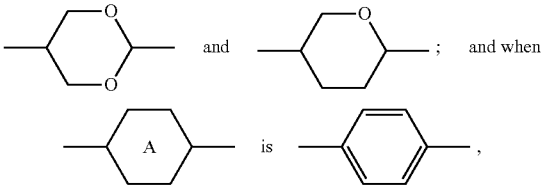

$Y_{3A}$ represents H;

$X_{1A}$ represents F, Cl, or $C_{1-5}$ alkyl or alkoxy which is with or without halogen substituent.

In some embodiments of the present invention, the $R_{1A}$ represents $C_{1-5}$ alkyl, $Y_{1A}$, $Y_{2A}$ and $Y_{3A}$ are same or different, and each independently is H or F; $X_{1A}$ represents F, $CF_3$ or $OCF_3$.

In some embodiments of the present invention, the compound of general formula I-2 is preferably selected from a group consisting of the following compounds:

I-2-1
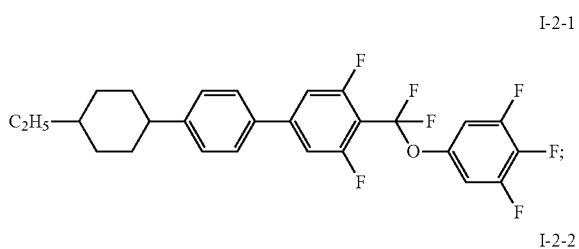

I-2-2

I-2-3

I-2-4
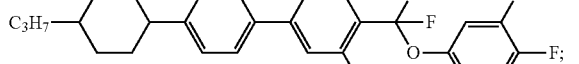

I-2-5

I-2-6
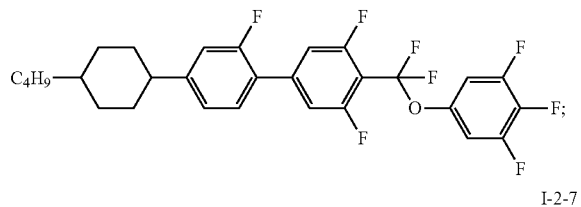
I-2-7
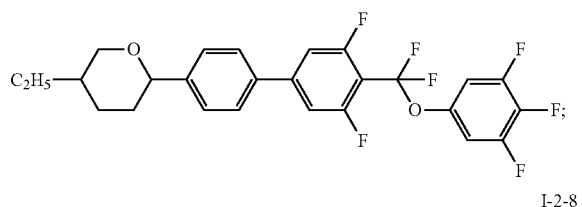
I-2-8
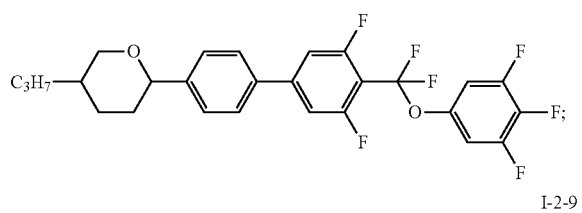
I-2-9
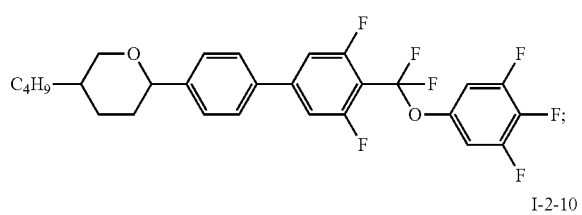
I-2-10
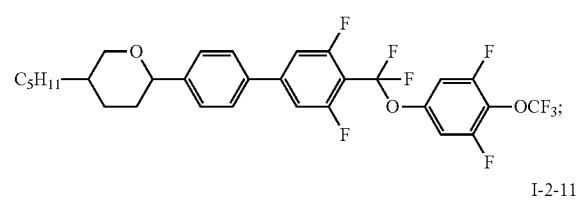
I-2-11
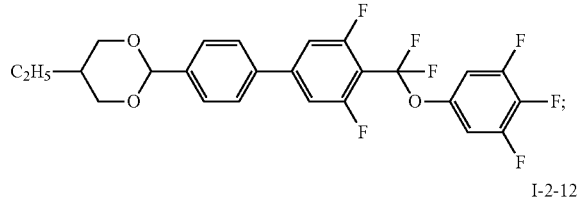
I-2-12
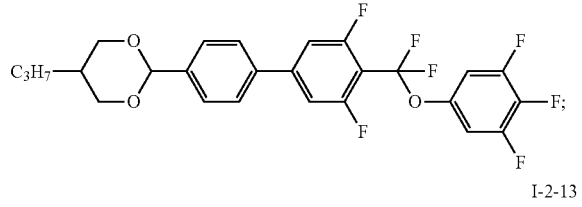
I-2-13
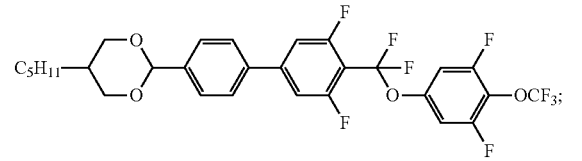
I-2-14
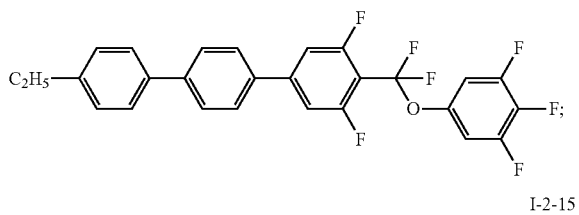
I-2-15
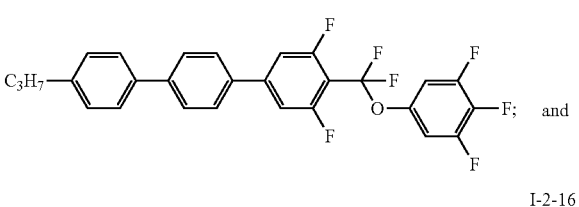
I-2-16
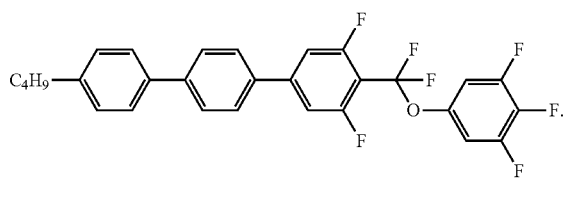
The compound of general formula I-2 is particularly preferably selected from a group consisting of the following compounds:
I-2-2
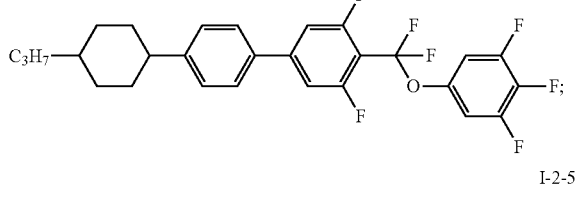
I-2-5
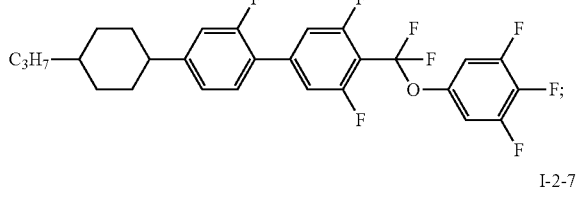
I-2-7
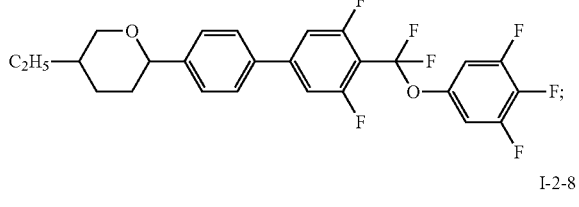
I-2-8
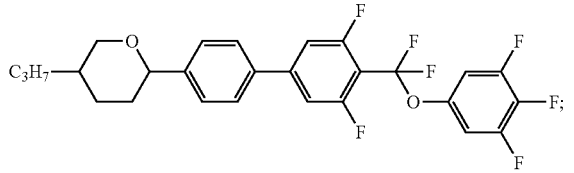

-continued

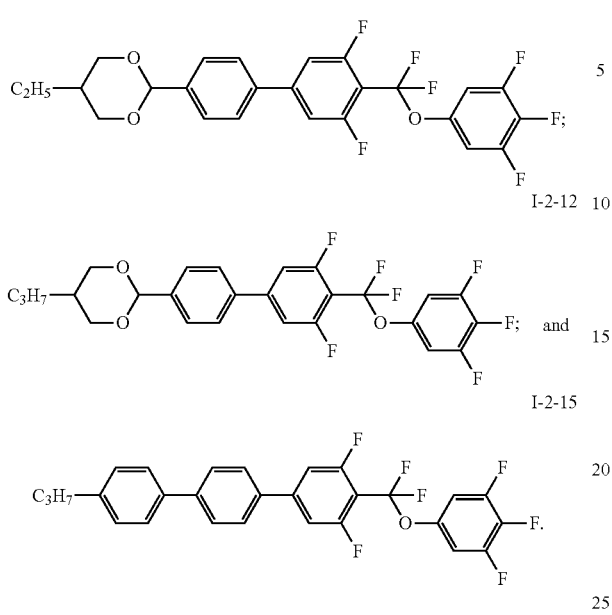

In an embodiment of the present invention, the liquid crystal composition further comprises:

10-50% by weight of the total amount of the liquid crystal composition of one or more compounds of general formula II

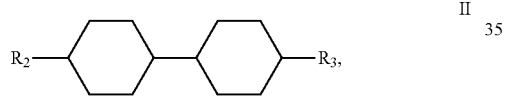

in which, $R_2$ and $R_3$ are same or different, and each independently represents $C_{1-5}$ alkyl or alkoxy, or $C_{2-5}$ alkenyl or alkenoxy.

In an embodiment of the present invention, it is preferred that the $R_2$ represents $C_{1-5}$ alkyl; the $R_3$ represents $C_{1-5}$ alkyl, or $C_{2-3}$ alkenyl.

In an embodiment of the present invention, the compound of general formula II preferably comprises 10-48% by weight of the total amount of the liquid crystal composition.

In an embodiment of the present invention, the compound of general formula II is preferably selected from a group consisting of the following compounds:

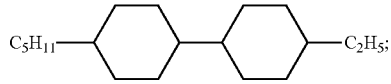

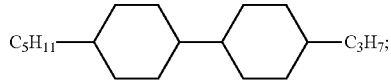

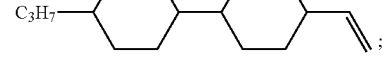

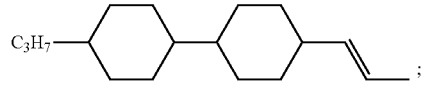

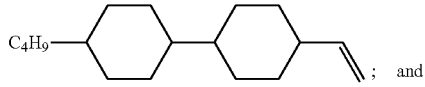

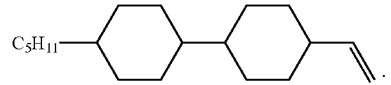

The compound of general formula II is particularly preferably selected from the following compounds:

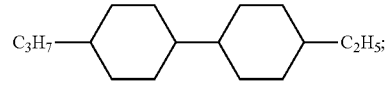

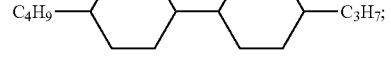

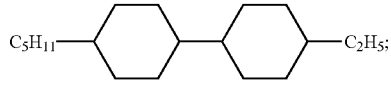

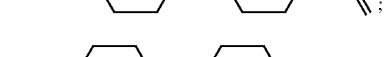

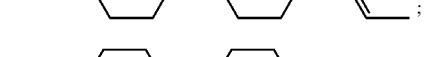

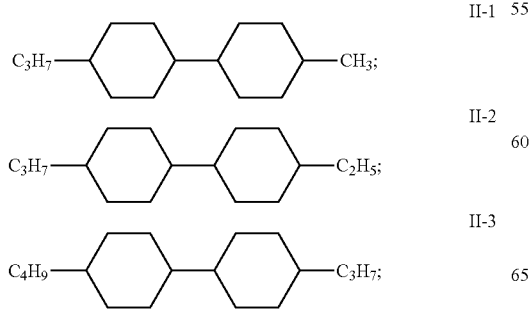

In an embodiment of the present invention, the liquid crystal composition further comprises:

0-50% by weight of the total amount of the liquid crystal composition of one or more compounds selected from a group consisting of compounds of general formula III-1, general formula III-2 and general formula III-3

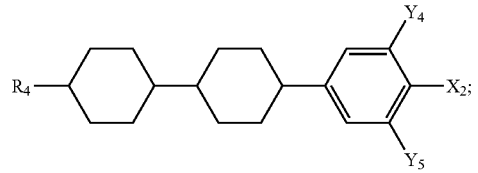

III-1

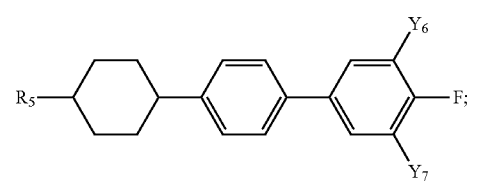

III-2

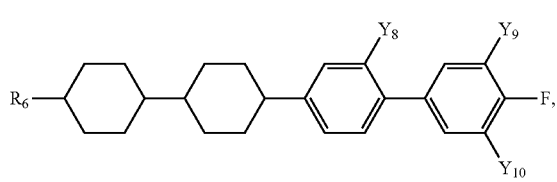

III-3 in which, $R_4$, $R_5$ and $R_6$ are same or different, and each independently represents $C_{1-5}$ alkyl or alkoxy, or $C_{2-5}$ alkenyl or alkenoxy;

$Y_4$, $Y_5$, $Y_6$, $Y_7$, $Y_8$, $Y_9$ and $Y_{10}$ are same or different, and each independently is H, F, or methyl or methoxyl which is with or without halogen substituent;

$X_2$ represents F, Cl, or $C_{1-5}$ alkyl or alkoxy which is with or without halogen substituent.

In an embodiment of the present invention, it is preferred that $R_4$, $R_5$ and $R_6$ are same or different, and each independently represents $C_{1-5}$ alkyl; the $Y_4$, $Y_5$, $Y_6$, $Y_7$, $Y_8$, $Y_9$ and $Y_{10}$ are same or different, and each independently is H or F; the $X_2$ represents F or $CF_3$.

In an embodiment of the present invention, the compounds of the group consisting of general formulas III-1, III-2, III-3 and the combination thereof preferably comprise 0-35% by weight of the total amount of the liquid crystal composition.

In an embodiment of the present invention, the compound of general formula III-1 is preferably selected from a group consisting of the following compounds:

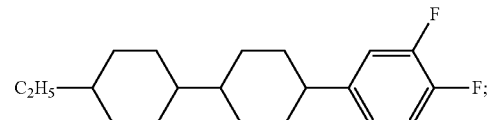

III-1-1

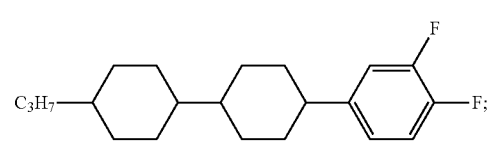

III-1-2

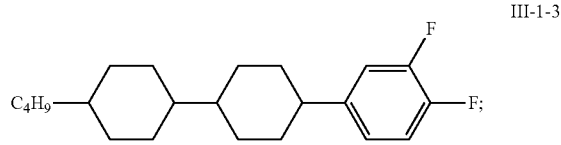

III-1-3

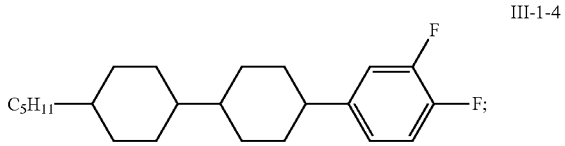

III-1-4

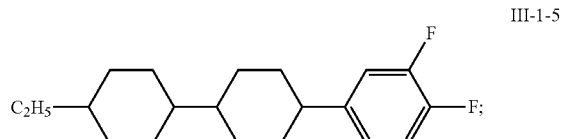

III-1-5

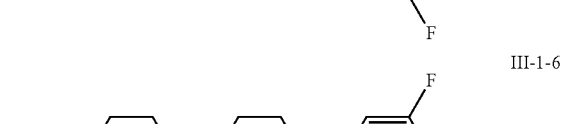

III-1-6

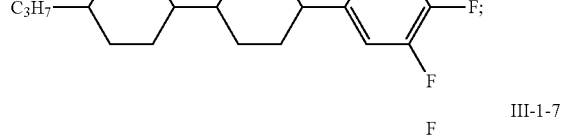

III-1-7

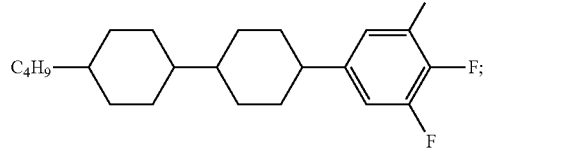

III-1-8

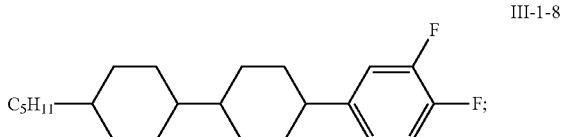

III-1-9

III-1-10

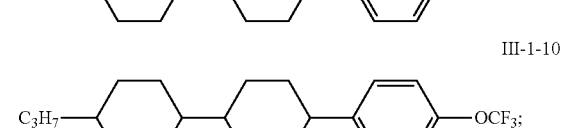

III-1-11 and

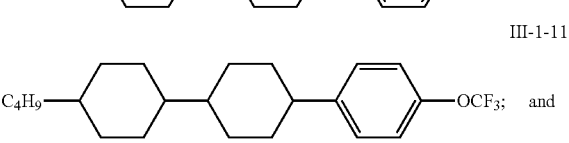

III-1-12

In an embodiment of the present invention, the compound of general formula III-2 is preferably selected from a group consisting of the following compounds:

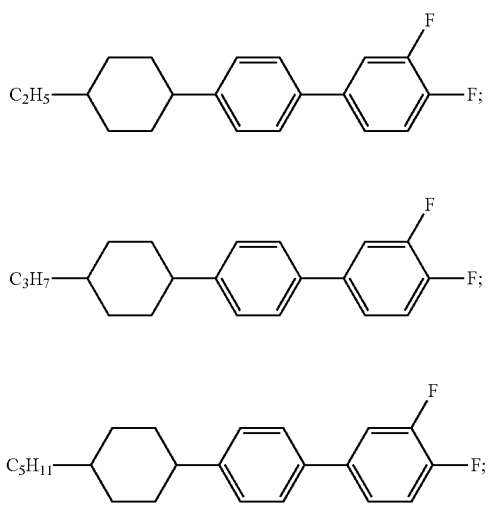
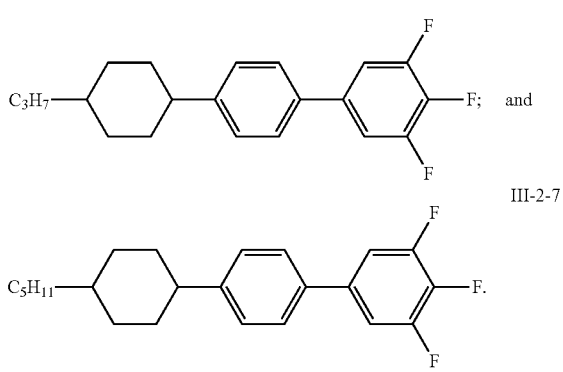
The compound of general formula III-2 is particularly preferably selected from the following compounds:
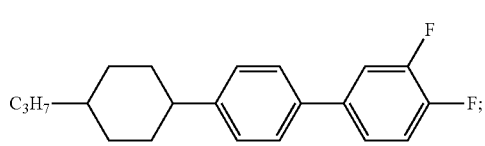
In an embodiment of the present invention, the compound of general formula III-3 is preferably selected from a group consisting of the following compounds:
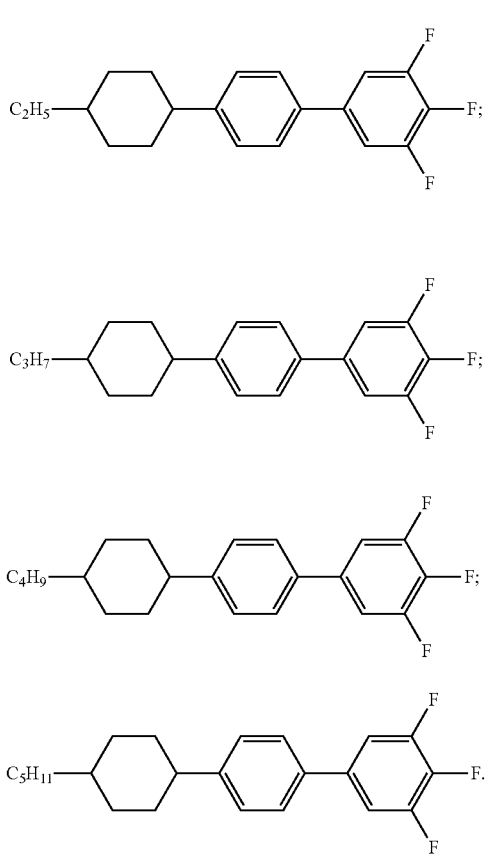

-continued

III-3-7

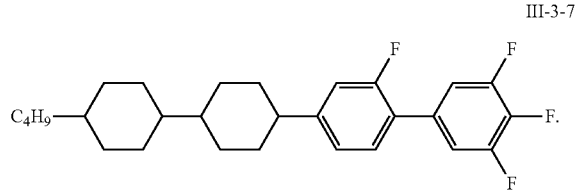

The compound of general formula III-3 is particularly preferably selected from the following compounds:

III-3-1

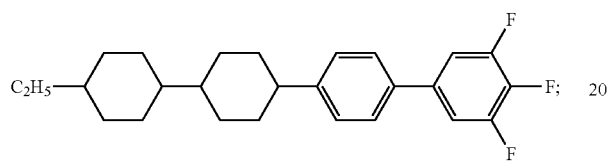

III-3-2

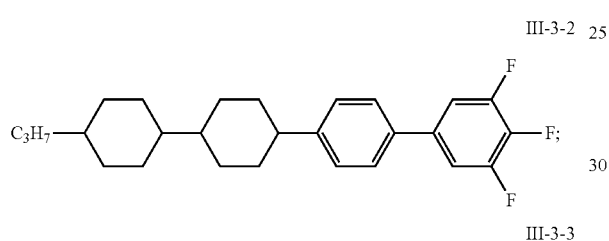

III-3-3

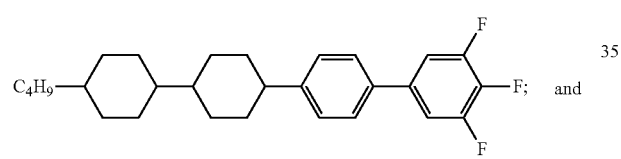

and

III-3-4

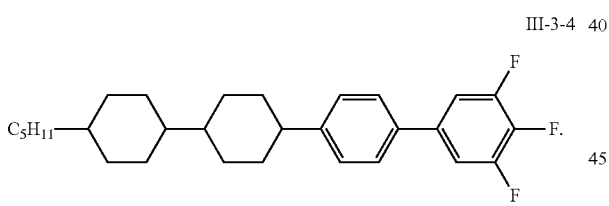

In an embodiment of the present invention, the liquid crystal composition further comprises:

0-30% by weight of the total amount of the liquid crystal composition of one or more compounds selected from general formula IV

IV

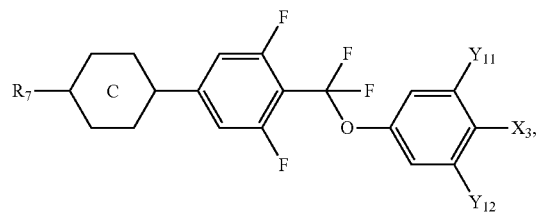

in which, $R_7$ represents $C_{1-5}$ alkyl;

$Y_{11}$ and $Y_{12}$ are same or different, and each independently represents F, Cl, or $C_{1-5}$ alkyl or alkoxy which is with or without halogen substituent;

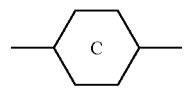

is selected from a group consisting of

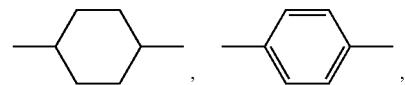

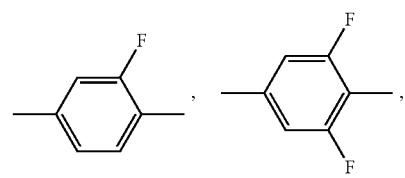

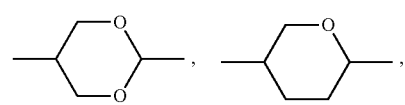

and

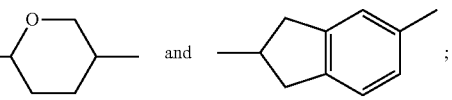

;

$X_3$ represents F, Cl, or $C_{1-5}$ alkyl or alkoxy which is with or without halogen substituent.

In an embodiment of the present invention, the $Y_{11}$ and $Y_{12}$ represent F; the

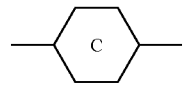

is selected from a group consisting of

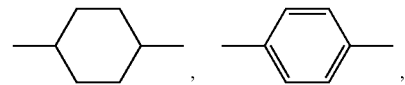

,

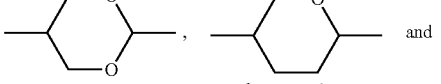

and

;

the $X_3$ represents F.

More preferably, the
is selected from a group consisting of
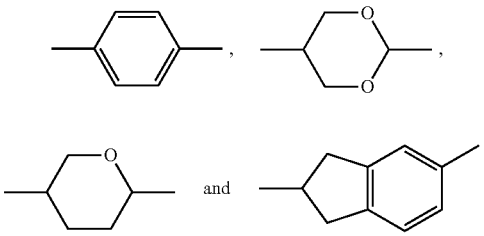
In an embodiment of the present invention, the compound of general formula IV is preferably selected from a group consisting of the following compounds:
IV-1
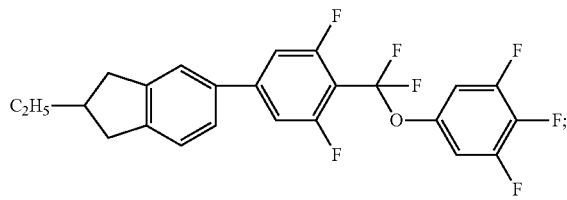
IV-2
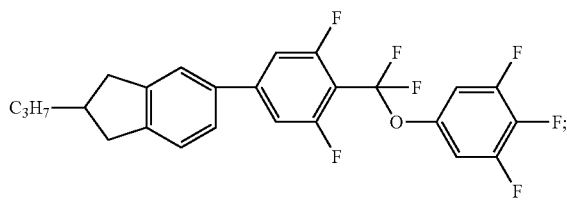
IV-3
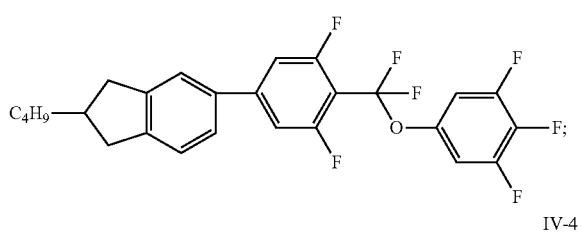
IV-4
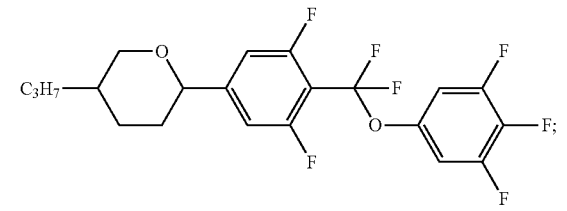
IV-5
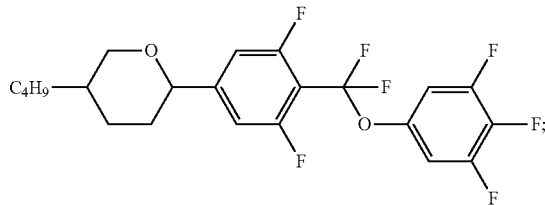
IV-6
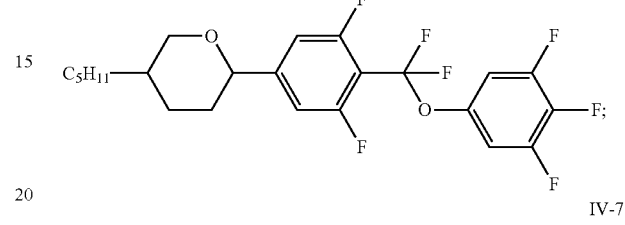
IV-7
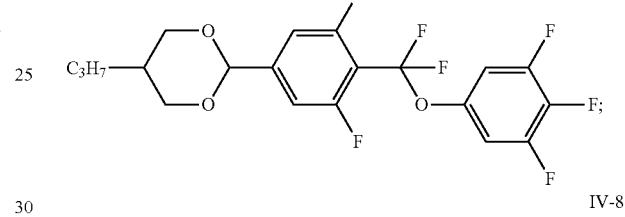
IV-8
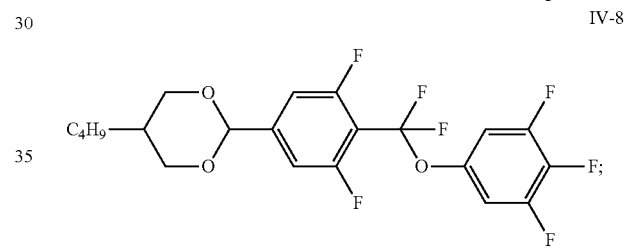
IV-9
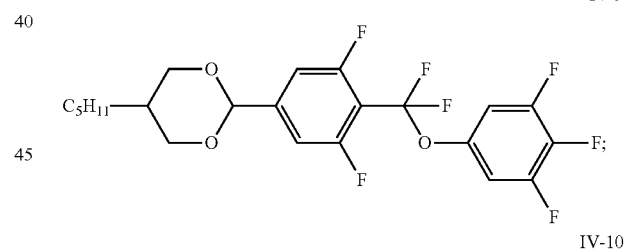
IV-10
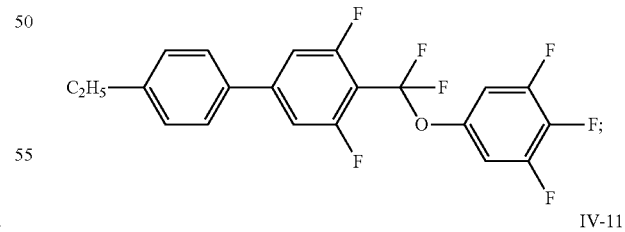
IV-11
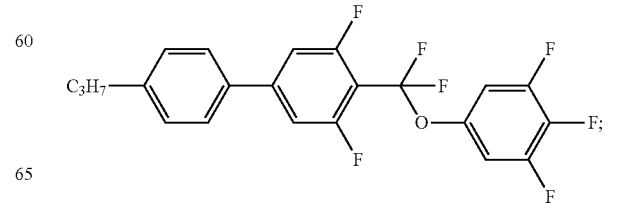

IV-12
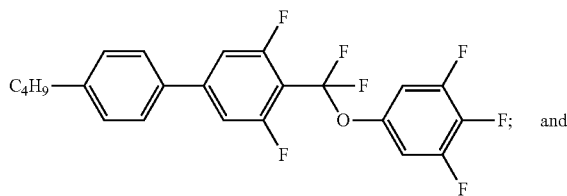

IV-10
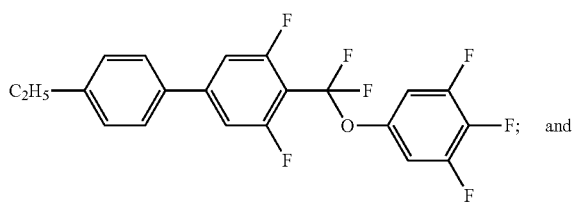
and

IV-13
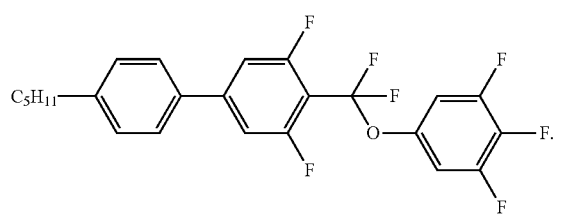

IV-11
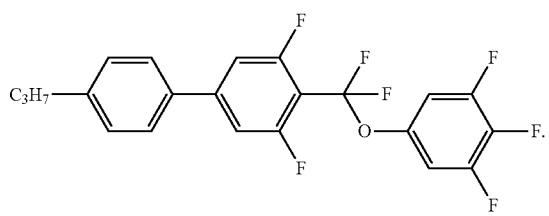

The compound of genera; formula IV is particularly preferably selected from the following compounds:

In an embodiment of the present invention, the liquid crystal composition further comprises:

0-40% by weight of the total amount of the liquid crystal composition of one or more compounds selected from a group consisting of compounds of formula V-1 to formula V-8

IV-1
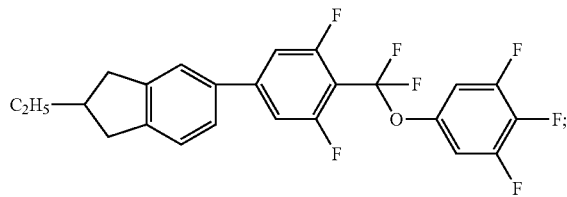

V-1
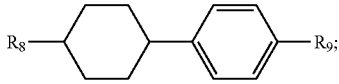

V-2
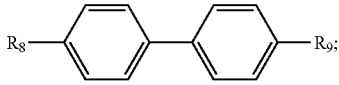

V-3

V-4
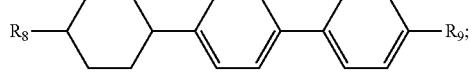

V-5
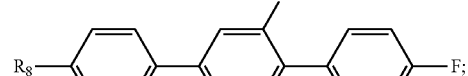

V-6
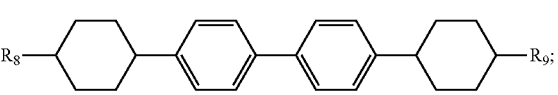

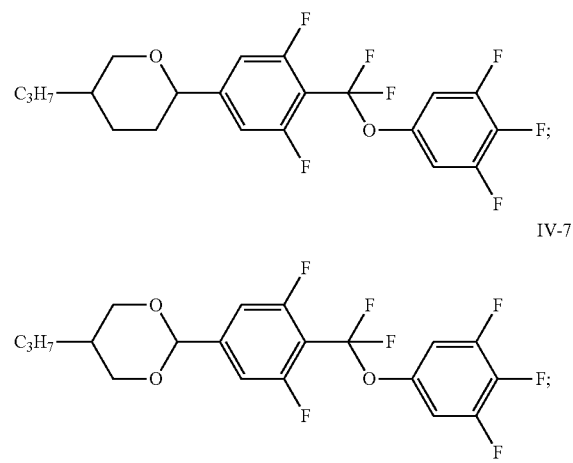

V-7
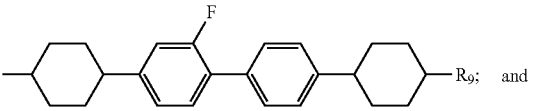
and

-continued

V-8

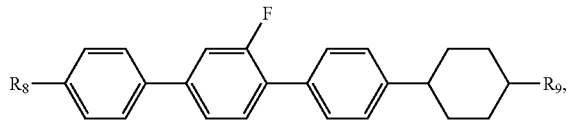

in which, $R_8$ and $R_9$ are same or different, and each independently represents $C_{1-5}$ alkyl or alkoxy, or $C_{2-5}$ alkenyl or alkenoxy.

In an embodiment of the present invention, the $R_8$ and $R_9$ are same or different, and each independently represents $C_{1-5}$ alkyl or alkoxy, or $C_{2-3}$ alkenyl.

In formula V-1, it is particularly preferred that the $R_8$ represents —$C_3H_7$, and the $R_9$ represents $C_{1-3}$ alkoxy.

In formula V-2, it is particularly preferred that the $R_8$ represents $C_{3-5}$ alkyl, and the $R_9$ represents $C_{1-3}$ alkyl.

In formula V-3, it is particularly preferred that the $R_8$ represents —$C_3H_7$ or $CH_2$=$CHC_2H_4$—, and the $R_9$ represents $C_{1-3}$ alkyl.

In formula V-4, it is particularly preferred that the $R_8$ represents —$C_3H_7$, and the $R_9$ represents $C_{1-3}$ alkyl or alkoxy.

In formula V-5, it is particularly preferred that the $R_8$ represents $C_{2-4}$ alkyl.

In formula V-6, it is particularly preferred that the $R_8$ represents $C_{3-5}$ alkyl, and the $R_9$ represents —$C_3H_7$.

In formula V-7, it is particularly preferred that the $R_8$ represents $C_{3-5}$ alkyl, and the $R_9$ represents —$C_3H_7$.

In formula V-8, it is particularly preferred that the $R_8$ represents $C_{2-3}$ alkyl, and the $R_9$ represents $C_{2-4}$ alkyl.

In an embodiment of the present invention, the compound of general formula I comprises 15-30% by weight of the total amount of the liquid crystal composition; the compound of general formula II comprises 15-48% by weight of the total amount of the liquid crystal composition; the compounds of the group consisting of general formulas III-1, III-2, III-3 and the combination thereof comprise 0-33% by weight of the total amount of the liquid crystal composition; the compound of general formula IV comprises 0-30% by weight of the total amount of the liquid crystal composition; and the compounds of general formulas V-1 to V-8 comprise 0-40% by weight of the total amount of the liquid crystal composition.

In an embodiment of the present invention, preferably, the compound of general formula I comprises 20-30% by weight of the total amount of the liquid crystal composition; the compound of general formula II comprises 20-48% by weight of the total amount of the liquid crystal composition; the compounds of the group consisting of general formulas III-1, III-2, III-3 and the combination thereof comprise 5-33% by weight of the total amount of the liquid crystal composition; the compound of general formula IV comprises 5-30% by weight of the total amount of the liquid crystal composition; and the compounds of general formulas V-1 to V-8 comprise 4-40% by weight of the total amount of the liquid crystal composition.

More preferably, the compound of general formula I comprises 20-30% by weight of the total amount of the liquid crystal composition; the compound of general formula II comprises 25-48% by weight of the total amount of the liquid crystal composition; the compounds of the group consisting of general formulas III-1, III-2, III-3 and the combination thereof comprise 10-33% by weight of the total amount of the liquid crystal composition; the compound of general formula IV comprises 5-28% by weight of the total amount of the liquid crystal composition; and the compounds of general formulas V-1 to V-8 comprise 4-40% by weight of the total amount of the liquid crystal composition.

As a particularly preferred solution, the compound of general formula I comprises 20-30% by weight of the total amount of the liquid crystal composition; the compound of general formula II comprises 25-48% by weight of the total amount of the liquid crystal composition; the compounds of the group consisting of general formulas III-1, III-2, III-3 and the combination thereof comprise 15-33% by weight of the total amount of the liquid crystal composition; the compound of general formula IV comprises 5-20% by weight of the total amount of the liquid crystal composition; and the compounds of general formulas V-1 to V-8 comprise 4-31% by weight of the total amount of the liquid crystal composition.

In another aspect, the present invention provides a liquid crystal composition, which further comprises one or more additives known to those skilled in the art and described in the literatures. For example, 0-15% of polychromatic dye and/or chiral dopant can be added.

Dopants which can be preferably added to the mixture according to the present invention are shown below.

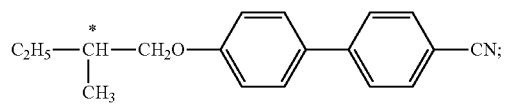

C 15

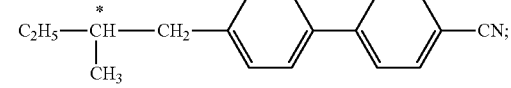

CB 15

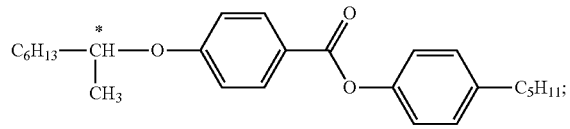

CM 21

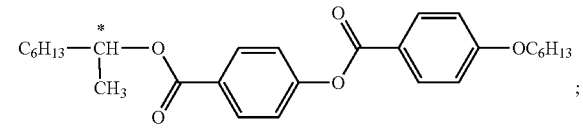

R/S-811

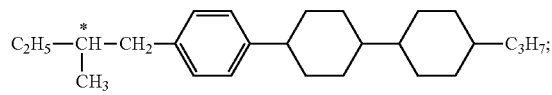

CM 44

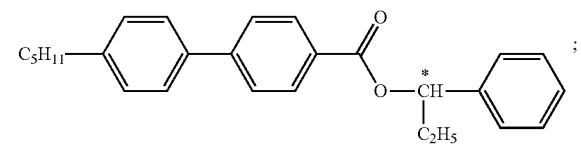

CM 45

-continued

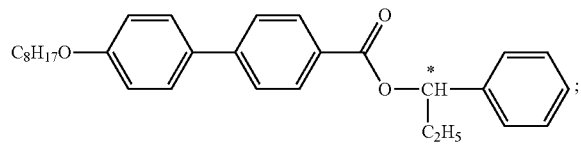
CM 47

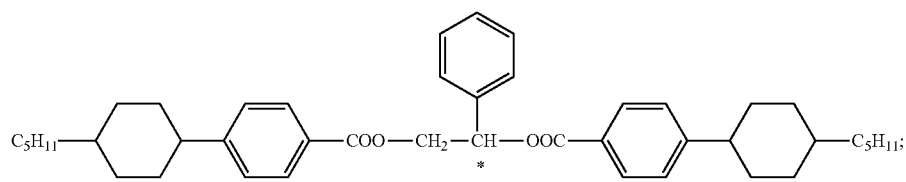
R/S-1011

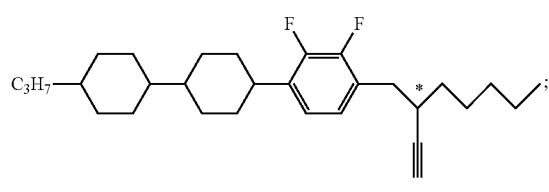
R/S-3011

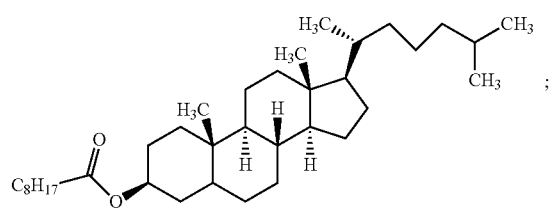
CN

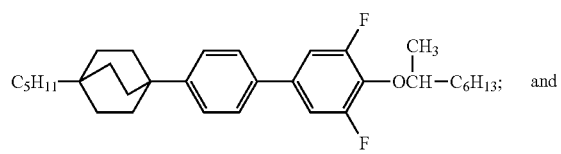
R/S-4011  and

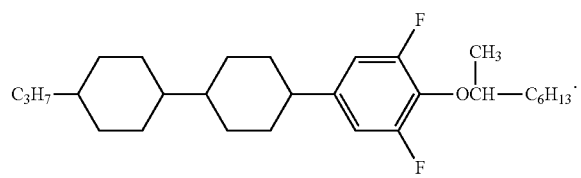
R/S-2011

In an embodiment of the present invention, preferably, the dopant comprises 0-5% by weight of the total amount of the liquid crystal composition; more preferably, the dopant comprises 0-1% by weight of the total amount of the liquid crystal composition.

Stabilizers which can be added, for example, to the mixture according to the invention are mentioned below.

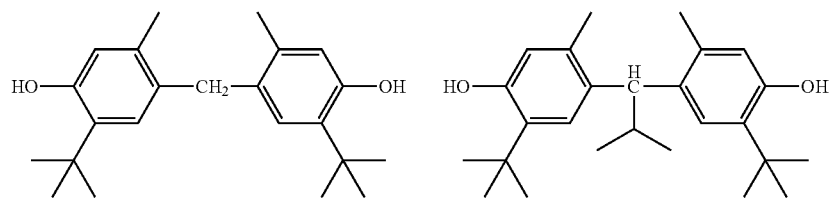

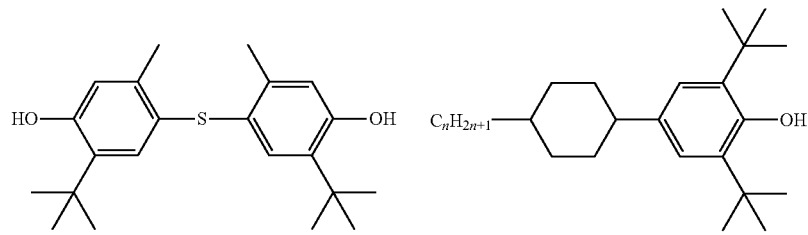

-continued
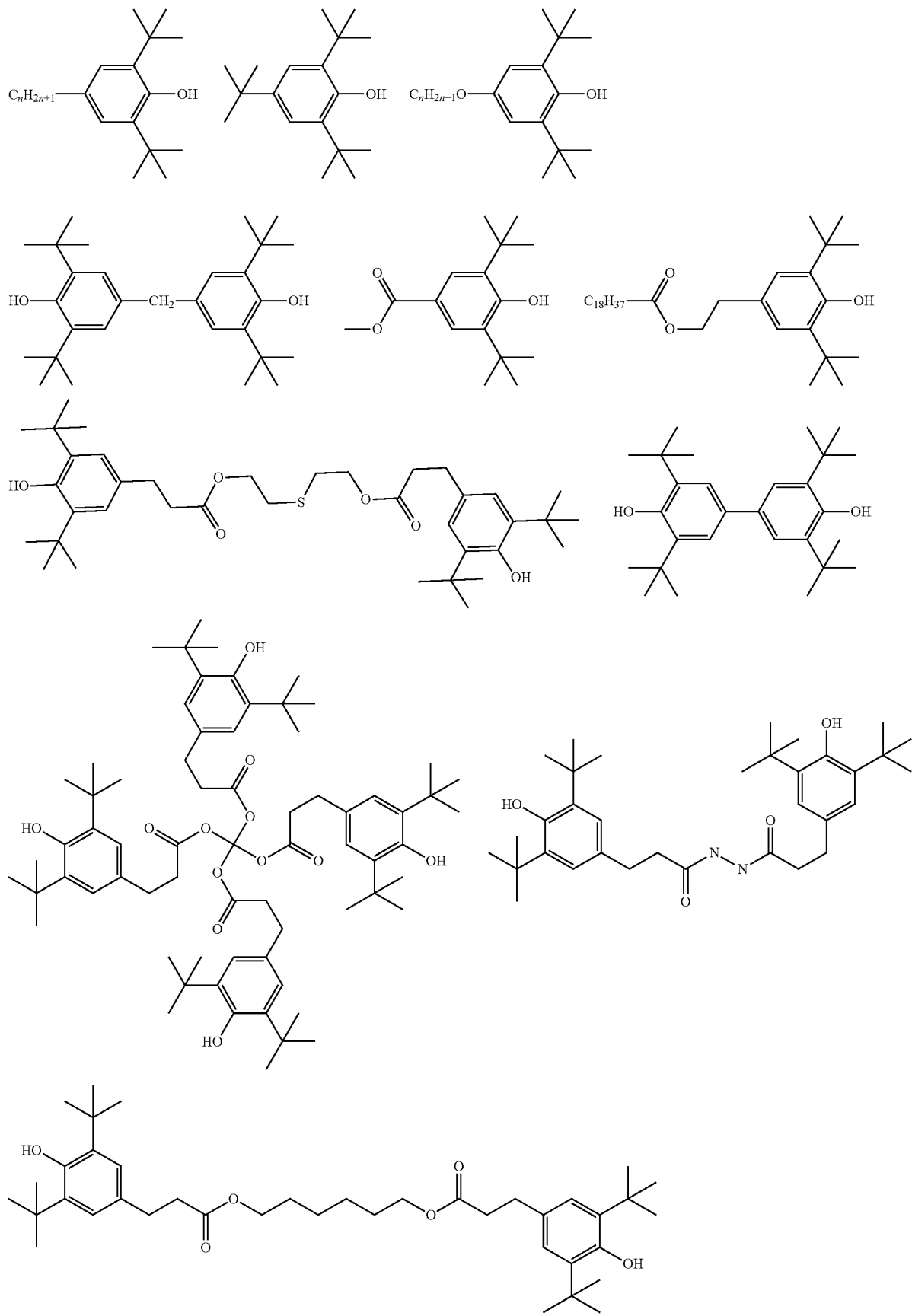

-continued
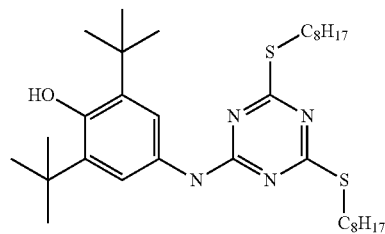
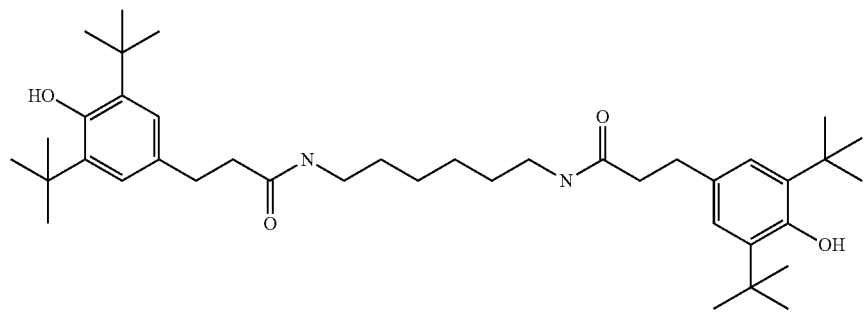
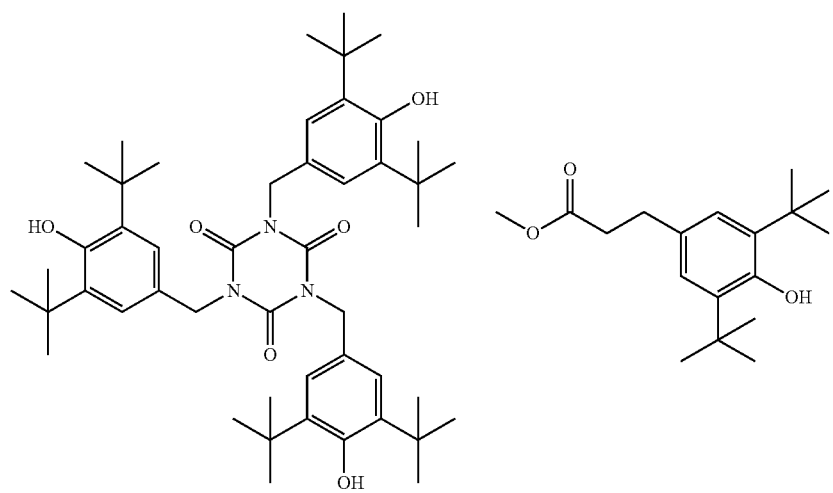
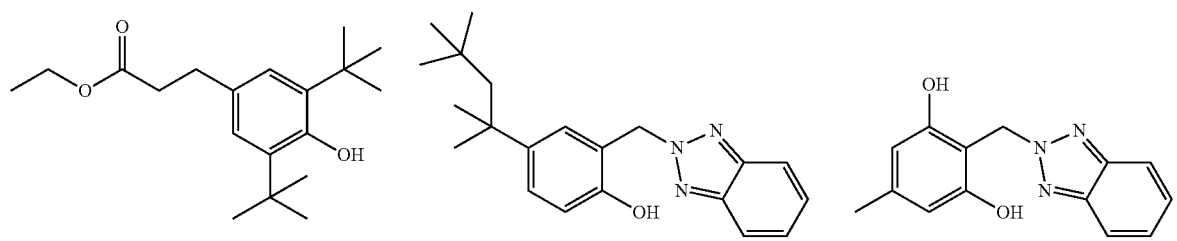
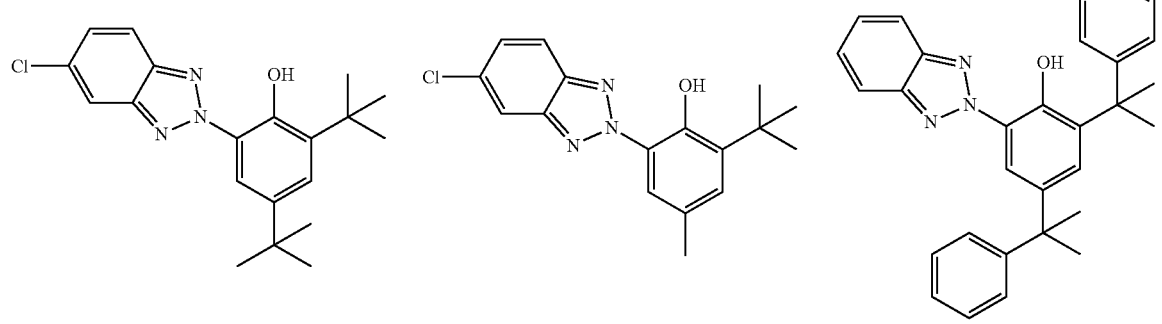

-continued
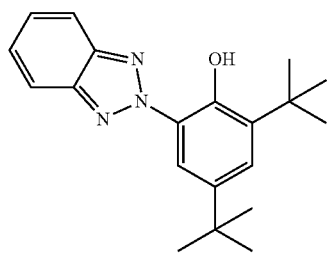
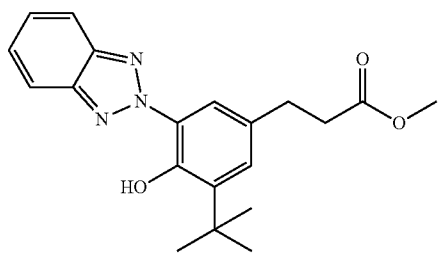
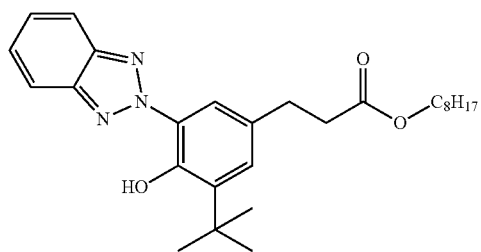
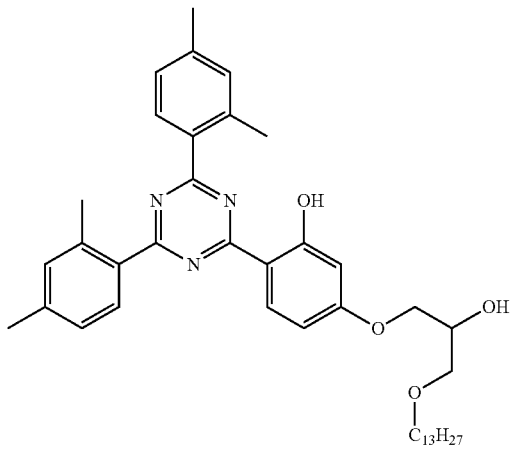
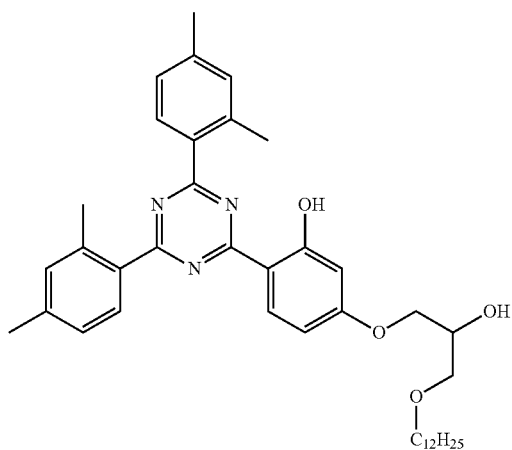
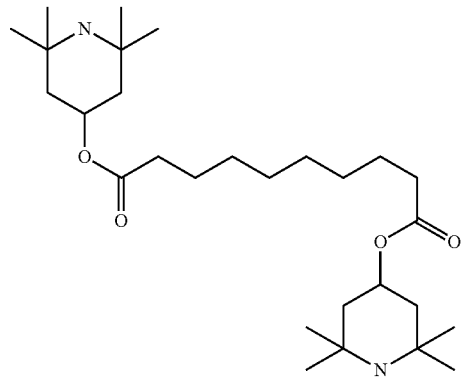
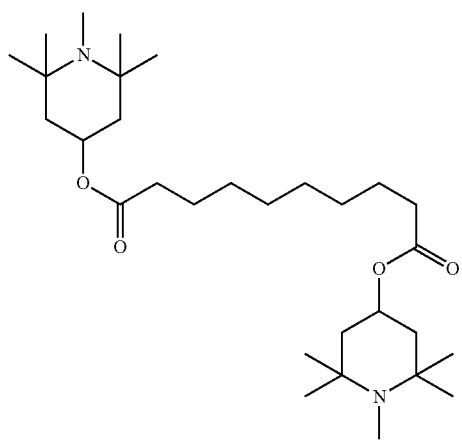

Preferably, the stabilizer is selected from a group consisting of stabilizers as shown below.

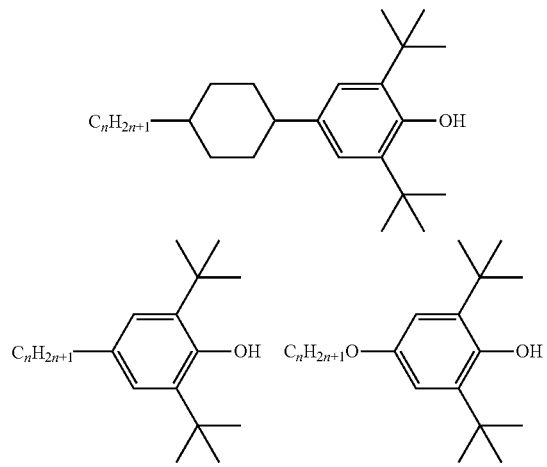

In an embodiment of the present invention, preferably, the stabilizer comprises 0-5% by weight of the total amount of the liquid crystal composition; more preferably, the stabilizer comprises 0-1% by weight of the total amount of the liquid crystal composition; as a particularly preferred embodiment, the stabilizer comprises 0-0.1% by weight of the total amount of the liquid crystal composition.

In still another aspect, the present invention provides a liquid crystal display device comprising the liquid crystal composition of the present invention.

Through performing combination experiments on the above compounds, the present invention determines that a liquid crystal medium comprising the above liquid crystal composition has appropriately high optical anisotropy, higher optical anisotropy, lower threshold voltage, suitably large elastic constant, suitable temperature range of nematic phase, good reliability and heat stability, and good low-temperature intersolubility, and is applicable to liquid crystal displays. The liquid crystal display including the liquid crystal composition has performances such as good high reliability and low-temperature storage performance, can still be well displayed in a harsh environment, and has low driving voltage characteristics.

Unless specifically indicated, in the present invention, the ratio is weight ratio, the temperature is in degree Celsius, and the cell gap selected for the test for response time data is 7 μm.

DETAILED EMBODIMENTS

The present invention will be illustrated by combining the detailed embodiments below. It should be noted that the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the liquid crystal compounds in the following Examples are represented by the codes listed in Table 1:

TABLE 1

Codes of the group structures of the liquid crystal compounds

| Unit structure of the group | Code | Name of the group |
|---|---|---|
| (1,4-cyclohexylidene structure) | C | 1,4-cyclohexylidene |
| (1,4-phenylene structure) | P | 1,4-phenylene |
| (2-fluoro-1,4-phenylene structure) | G | 2-fluoro-1,4-phenylene |
| (2,5-difluoro-1,4-phenylene structure) | U | 2,5-difluoro-1,4-phenylene |
| (oxanyl structure) | A | oxanyl |
| (dioxanyl structure) | D | dioxanyl |
| (indan-2,5-diyl structure) | I | indan-2,5-diyl |
| —F | F | fluorine substituent |
| —CH=CH— | V | alkenyl |
| —CF$_2$O— | Q | difluoro ether group |
| —CF$_3$ | CF3 | trifluoromethyl |
| —OCF$_3$ | OCF3 | trifluoromethoxy |
| —C$_n$H$_{2n+1}$ or —C$_m$H$_{2m+1}$ | n or m | alkyl |

Take the following structural formula as an example:

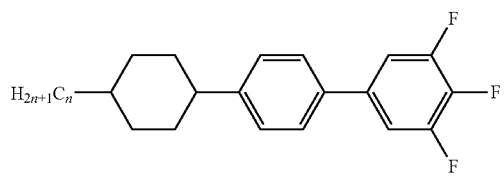

Represented by the codes listed in Table 2, this structural formula can be expressed as nCPUF, in which, the n in the code represents the number of the carbon atoms of the alkyl group on the left, for example, n is "3", meaning that the alkyl is —C$_3$H$_7$; the C in the code represents "cyclohexyl".

The abbreviated codes of the test items in the following Examples are as follows:

Cp (° C.) clearing point (nematic-isotropy phase transition temperature)

Δn: optical anisotropy (589 nm, 25° C.)

Δε: dielectric constant anisotropy (1 KHz, 25° C.)

γ1: rotational viscosity (mPa*s, at 25° C.)

$K_{11}$: elastic constant ("splay", the pN at 25° C.)
$K_{33}$: elastic constant ("blend", the pN at 25° C.)
LTS (bottle at −25° C.): low-temperature storage time (at −25° C.)
LTS (bottle at −30° C.): low-temperature storage time (at −30° C.)
VHR (initial): voltage holding ratio (%)
VHR (high temperature): voltage holding ratio after holding at high temperature of 150° C. for 1 h (%)

In which, the optical anisotropy is tested and obtained by using abbe refractometer under sodium lamp (589 nm) light source at 20° C.; the dielectric test cell is the TN90 type with a cell gap is 7 μm.

$\Delta\varepsilon = \varepsilon | - \varepsilon\perp$, in which, $\varepsilon|$ all is a dielectric constant parallel to the molecular axis, $\varepsilon\perp$ is a dielectric constant perpendicular to the molecular axis, with the test conditions: 25° C., 1 KHz, TN90 type test cell with a cell gap of 7 μm.

γ1 is tested and obtained by the TOY06254 type liquid crystal physical property evaluation system; the test temperature is 25° C., and the test voltage is 90 V.

VHR (initial) is tested and obtained by the TOY06254 type liquid crystal physical property evaluation system; the test temperature is 60° C., the test voltage is 5 V, and the test frequency is 6 Hz.

VHR (high temperature) is tested and obtained by the TOY06254 type liquid crystal physical property evaluation system; the liquid crystal is tested after being held at a high temperature of 150° C. for 1 h, the test temperature is 60° C., the test voltage is 5 V, and the test frequency is 6 Hz.

Example 1

The liquid crystal composition of Example 1 is prepared according to each compound and weight percentage listed in Table 2, and then tested by filling the same between two substrates of a liquid crystal display device. The test data is shown in the Table below:

TABLE 2

Formulation of the liquid crystal composition and its test performance

| Code of component | No. of compound | Content percentage | Test results for the performance parameters | |
|---|---|---|---|---|
| 2IUQUF | IV-1 | 6 | Δn | 0.109 |
| 3IUQUF | IV-2 | 8 | Δε | 12.6 |
| 3PGUQUF | I-1-2 | 6 | Cp | 78.7 |
| 4PGUQUF | I-1-3 | 6 | γ1 | 81 |
| 5PGUQUF | I-1-4 | 6 | $K_{11}$ | 12.7 |
| 2PGUQPOCF3 | I-1-8 | 5 | $K_{33}$ | 14.3 |
| 3PGUQPOCF3 | I-1-9 | 3 | LTS (bottle at −25° C.) | >1500 h |
| 2CCGF | III-1-1 | 2 | LTS (bottle at −30° C.) | >1500 h |
| 3CCGF | III-1-2 | 8 | VHR (initial) | 97.5 |
| 4CCGF | III-1-3 | 3 | VHR (high temperature) | 97.1 |
| 5CCGF | III-1-4 | 5 | | |
| 3CCPOCF3 | III-1-10 | 9 | | |
| 3CCV | II-6 | 33 | | |
| Total | | 100 | | |

Example 2

The liquid crystal composition of Example 2 is prepared according to each compound and weight percentage listed in Table 3, and then tested by filling the same between two substrates of a liquid crystal display device. The test data is shown in the Table below:

TABLE 3

Formulation of the liquid crystal composition and its test performance

| Code of component | No. of compound | Content percentage | Test results for the performance parameters | |
|---|---|---|---|---|
| 2IUQUF | IV-1 | 8 | Δn | 0.107 |
| 3IUQUF | IV-2 | 8 | Δε | 12.7 |
| 3PGUQUF | I-1-2 | 5 | Cp | 80.2 |
| 4PGUQUF | I-1-3 | 5 | γ1 | 84 |
| 5PGUQUF | I-1-4 | 5 | $K_{11}$ | 12.2 |
| 2PGUQPOCF3 | I-1-8 | 3 | $K_{33}$ | 14.3 |
| 3PGUQPOCF3 | I-1-9 | 4 | LTS (bottle at −25° C.) | >1000 h |
| 3CCGF | III-1-2 | 10 | LTS (bottle at −30° C.) | >1000 h |
| 4CCGF | III-1-3 | 8 | VHR (initial) | 97.2 |
| 3CCPOCF3 | III-1-10 | 15 | VHR (high temperature) | 96.9 |
| 3CCV | II-6 | 29 | | |
| Total | | 100 | | |

Example 3

The liquid crystal composition of Example 3 is prepared according to each compound and weight percentage listed in Table 4, and then tested by filling the same between two substrates of a liquid crystal display device. The test data is shown in the Table below:

TABLE 4

Formulation of the liquid crystal composition and its test performance

| Code of component | No. of compound | Content percentage | Test results for the performance parameters | |
|---|---|---|---|---|
| 2IUQUF | IV-1 | 6.5 | Δn | 0.108 |
| 3IUQUF | IV-2 | 8 | Δε | 12.8 |
| 3PGUQUF | I-1-2 | 6 | Cp | 80.8 |
| 4PGUQUF | I-1-3 | 6 | γ1 | 90 |
| 5PGUQUF | I-1-4 | 6 | $K_{11}$ | 12.6 |
| 2PGUQPOCF3 | I-1-8 | 5 | $K_{33}$ | 14.1 |
| 3PGUQPOCF3 | I-1-9 | 2.5 | LTS (bottle at −25° C.) | >1000 h |
| 2CCGF | III-1-1 | 4.5 | LTS (bottle at −30° C.) | >1000 h |
| 3CCGF | III-1-2 | 7 | VHR (initial) | 97.7 |
| 4CCGF | III-1-3 | 5 | VHR (high temperature) | 97.6 |
| 3CCPOCF3 | III-1-10 | 10 | | |
| 3CPPC3 | V-6 | 1.5 | | |
| 3CCV | II-6 | 22 | | |
| 3CC2 | II-2 | 10 | | |
| Total | | 100 | | |

Example 4

The liquid crystal composition of Example 4 is prepared according to each compound and weight percentage listed in Table 5, and then tested by filling the same between two substrates of a liquid crystal display device. The test data is shown in the Table below:

TABLE 5

Formulation of the liquid crystal composition and its test performance

| Code of component | No. of compound | Content percentage | Test results for the performance parameters | |
|---|---|---|---|---|
| 2PGUQUF | I-1-1 | 3 | $\Delta n$ | 0.112 |
| 3PGUQUF | I-1-2 | 4 | $\Delta\varepsilon$ | 13.5 |
| 4PGUQUF | I-1-3 | 3 | Cp | 75 |
| 3APUQUF | I-2-7 | 5 | $\gamma 1$ | 87 |
| 2PUQUF | IV-10 | 8 | $K_{11}$ | 13.5 |
| 3PUQUF | IV-11 | 14 | $K_{33}$ | 15.2 |
| 3IUQUF | IV-2 | 6 | LTS (bottle at −25° C.) | >1000 h |
| 2CCUF | III-1-5 | 4 | LTS (bottle at −30° C.) | >1000 h |
| 3CCUF | III-1-6 | 8 | VHR (initial) | 97.2 |
| 3CCPUF | III-3-2 | 4 | VHR (high temperature) | 96.7 |
| 4CCPUF | III-3-3 | 4 | | |
| 3CCP1 | V-3 | 4 | | |
| 3CCV | II-6 | 28 | | |
| 3CGPC3 | V-7 | 5 | | |
| Total | | 100 | | |

Example 5

The liquid crystal composition of Example 5 is prepared according to each compound and weight percentage listed in Table 6, and then tested by filling the same between two substrates of a liquid crystal display device. The test data is shown in the Table below:

TABLE 6

Formulation of the liquid crystal composition and its test performance

| Code of component | No. of compound | Content percentage | Test results for the performance parameters | |
|---|---|---|---|---|
| 2PGUQPOCF3 | I-1-8 | 3 | $\Delta n$ | 0.11 |
| 3PGUQPOCF3 | I-1-9 | 4 | $\Delta\varepsilon$ | 12.1 |
| 4PGUQPOCF3 | I-1-10 | 4 | Cp | 78.9 |
| 3DPUQUF | I-2-12 | 5 | $\gamma 1$ | 82 |
| 2IUQUF | IV-1 | 8 | $K_{11}$ | 13.7 |
| 3IUQUF | IV-2 | 8 | $K_{33}$ | 15.3 |
| 3DUQUF | IV-7 | 4 | LTS (bottle at −25° C.) | >1000 h |
| 3AUQUF | IV-4 | 4 | LTS (bottle at −30° C.) | >1000 h |
| 3CCUF | III-1-6 | 6 | VHR (initial) | 97.1 |
| 3CCPUF | III-3-2 | 6 | VHR (high temperature) | 96.5 |
| 3CPUF | III-2-5 | 6 | | |
| 3CCP3 | V-3 | 9 | | |
| 3CCV | II-6 | 30 | | |
| 3CPPC3 | V-6 | 3 | | |
| Total | | 100 | | |

Example 6

The liquid crystal composition of Example 6 is prepared according to each compound and weight percentage listed in Table 7, and then tested by filling the same between two substrates of a liquid crystal display device. The test data is shown in the Table below:

TABLE 7

Formulation of the liquid crystal composition and its test performance

| Code of component | No. of compound | Content percentage | Test results for the performance parameters | |
|---|---|---|---|---|
| 2PGUQUF | I-1-1 | 5 | $\Delta n$ | 0.11 |
| 3PGUQUF | I-1-2 | 5 | $\Delta\varepsilon$ | 12.3 |
| 4PGUQUF | I-1-3 | 5 | Cp | 73 |
| 2PUQUF | IV-10 | 10 | $\gamma 1$ | 85 |
| 3PUQUF | IV-11 | 16 | $K_{11}$ | 12.9 |
| 3CCGF | III-1-2 | 6 | $K_{33}$ | 14.8 |
| 4CCGF | III-1-3 | 4 | LTS (bottle at −25° C.) | >1000 h |
| 3CCPOCF3 | III-1-10 | 8 | LTS (bottle at −30° C.) | >1000 h |
| 3CPP2 | V-4 | 6 | VHR (initial) | 97.4 |
| 3CCV | II-6 | 25 | VHR (high temperature) | 97.0 |
| 3CPO2 | V-1 | 6 | | |
| 5CPPC3 | V-6 | 4 | | |
| Total | | 100 | | |

Example 7

The liquid crystal composition of Example 7 is prepared according to each compound and weight percentage listed in Table 8, and then tested by filling the same between two substrates of a liquid crystal display device. The test data is shown in the Table below:

TABLE 8

Formulation of the liquid crystal composition and its test performance

| Code of component | No. of compound | Content percentage | Test results for the performance parameters | |
|---|---|---|---|---|
| 2PGUQPCF3 | I-1-5 | 4 | $\Delta n$ | 0.109 |
| 3PGUQPCF3 | I-1-6 | 4 | $\Delta\varepsilon$ | 11 |
| 4PGUQPCF3 | I-1-7 | 4 | Cp | 72.1 |
| 3CGUQUF | I-2-5 | 3 | $\gamma 1$ | 79 |
| 3CPUQUF | I-2-2 | 3 | $K_{11}$ | 13.2 |
| 3PUQUF | IV-11 | 8 | $K_{33}$ | 14.4 |
| 2IUQUF | IV-1 | 6 | LTS (bottle at −25° C.) | >1000 h |
| 3IUQUF | IV-2 | 8 | LTS (bottle at −30° C.) | >1000 h |
| 3CCUF | III-1-6 | 6 | VHR (initial) | 97.6 |
| 5CCUF | III-1-8 | 5 | VHR (high temperature) | 97.0 |
| 3CCV | II-6 | 28 | | |
| 3CCV1 | II-7 | 5 | | |
| 3PP2 | V-2 | 5 | | |
| 3CPPC3 | V-6 | 3 | | |
| 3PGPF | V-5 | 4 | | |
| 2PGPC4 | V-8 | 4 | | |
| Total | | 100 | | |

Example 8

The liquid crystal composition of Example 8 is prepared according to each compound and weight percentage listed in Table 9, and then tested by filling the same between two substrates of a liquid crystal display device. The test data is shown in the Table below:

TABLE 9

Formulation of the liquid crystal composition and its test performance

| Code of component | No. of compound | Content percentage | Test results for the performance parameters | |
|---|---|---|---|---|
| 2PGUQUF | I-1-1 | 4 | $\Delta n$ | 0.107 |
| 3PGUQUF | I-1-2 | 4 | $\Delta \varepsilon$ | 11.8 |
| 4PGUQUF | I-1-3 | 4 | Cp | 74.2 |
| 3PGUQPOCF3 | I-1-9 | 4 | $\gamma 1$ | 77 |
| 2DPUQUF | I-2-11 | 4 | $K_{11}$ | 13.1 |
| 2IUQUF | IV-1 | 8 | $K_{33}$ | 14.4 |
| 3IUQUF | IV-2 | 11 | LTS (bottle at −25° C.) | >1000 h |
| 2CCPUF | III-3-1 | 4 | LTS (bottle at −30° C.) | >1000 h |
| 2CCGF | III-1-1 | 4 | VHR (initial) | 97.3 |
| 3CCGF | III-1-2 | 6 | VHR (high temperature) | 96.9 |
| 4CCGF | III-1-3 | 6 | | |
| V2CCP1 | V-3 | 4 | | |
| 3CCV | II-6 | 29 | | |
| 5CCV | II-9 | 6 | | |
| 5CGPC3 | V-7 | 2 | | |
| Total | | 100 | | |

Example 9

The liquid crystal composition of Example 9 is prepared according to each compound and weight percentage listed in Table 10, and then tested by filling the same between two substrates of a liquid crystal display device. The test data is shown in the Table below:

TABLE 10

Formulation of the liquid crystal composition and its test performance

| Code of component | No. of compound | Content percentage | Test results for the performance parameters | |
|---|---|---|---|---|
| 2PGUQPOCF3 | I-1-8 | 5 | $\Delta n$ | 0.121 |
| 3PGUQPOCF3 | I-1-9 | 5 | $\Delta \varepsilon$ | 11.2 |
| 4PGUQPOCF3 | I-1-10 | 5 | Cp | 95.1 |
| 5PGUQPOCF3 | I-1-11 | 5 | $\gamma 1$ | 99 |
| 3PPUQUF | I-2-15 | 2 | $K_{11}$ | 14.8 |
| 2PUQUF | IV-10 | 6 | $K_{33}$ | 16.2 |
| 3PUQUF | IV-11 | 10 | LTS (bottle at −25° C.) | >1000 h |
| 5CCGF | III-1-4 | 6 | LTS (bottle at −30° C.) | >1000 h |
| 2CCPOCF3 | III-1-9 | 9 | VHR (initial) | 97.4 |
| 3CCPOCF3 | III-1-10 | 10 | VHR (high temperature) | 96.8 |
| 3CCV | II-6 | 31 | | |
| 3PGPC2 | V-8 | 3 | | |
| 2PGPC3 | V-8 | 3 | | |
| Total | | 100 | | |

Example 10

The liquid crystal composition of Example 10 is prepared according to each compound and weight percentage listed in Table 11, and then tested by filling the same between two substrates of a liquid crystal display device. The test data is shown in the Table below:

TABLE 11

Formulation of the liquid crystal composition and its test performance

| Code of component | No. of compound | Content percentage | Test results for the performance parameters | |
|---|---|---|---|---|
| 2PGUQUF | I-1-1 | 4 | $\Delta n$ | 0.117 |
| 3PGUQUF | I-1-2 | 4 | $\Delta \varepsilon$ | 10.3 |
| 2PGUQPOCF3 | I-1-8 | 3 | Cp | 72.7 |
| 3PGUQPOCF3 | I-1-9 | 4 | $\gamma 1$ | 73 |
| 4PGUQPOCF3 | I-1-10 | 3 | $K_{11}$ | 14.1 |
| 2APUQUF | I-2-7 | 3 | $K_{33}$ | 15.2 |
| 3APUQUF | I-2-8 | 4 | LTS (bottle at −25° C.) | >1000 h |
| 2PUQUF | IV-10 | 3 | LTS (bottle at −30° C.) | >1000 h |
| 3PUQUF | IV-11 | 3 | VHR (initial) | 97.7 |
| 3DUQUF | IV-7 | 3 | VHR (high temperature) | 97.4 |
| 3AUQUF | IV-4 | 3 | | |
| VCCP1 | V-3 | 12 | | |
| 3CCV | II-6 | 30 | | |
| 3CCV1 | II-7 | 10 | | |
| 5PP1 | V-2 | 8 | | |
| 3PGPC4 | V-8 | 3 | | |
| Total | | 100 | | |

Example 11

The liquid crystal composition of Example 11 is prepared according to each compound and weight percentage listed in Table 12, and then tested by filling the same between two substrates of a liquid crystal display device. The test data is shown in the Table below:

TABLE 12

Formulation of the liquid crystal composition and its test performance

| Code of component | No. of compound | Content percentage | Test results for the performance parameters | |
|---|---|---|---|---|
| 2PGUQPOCF3 | I-1-8 | 6 | $\Delta n$ | 0.125 |
| 3PGUQPOCF3 | I-1-9 | 8 | $\Delta \varepsilon$ | 9.5 |
| 4PGUQPOCF3 | I-1-10 | 8 | Cp | 100.3 |
| 3CPUQUF | I-2-2 | 5 | $\gamma 1$ | 88 |
| 3PUQUF | IV-11 | 10 | $K_{11}$ | 13.3 |
| 3CPPO1 | V-4 | 5 | $K_{33}$ | 14.2 |
| 3CCP3 | V-3 | 8 | LTS (bottle at −25° C.) | >1000 h |
| 3CCV | II-6 | 23 | LTS (bottle at −30° C.) | >1000 h |
| 3CPO1 | V-1 | 8 | VHR (initial) | 97.8 |
| 3CPO2 | V-1 | 7 | VHR (high temperature) | 97.3 |
| 3CPPC3 | V-6 | 3 | | |
| 3CPPC5 | V-6 | 3 | | |
| 2PGPF | V-5 | 2 | | |
| 3PGPF | V-5 | 2 | | |
| 4PGPF | V-5 | 2 | | |
| Total | | 100 | | |

Example 12

The liquid crystal composition of Example 12 is prepared according to each compound and weight percentage listed in Table 13, and then tested by filling the same between two substrates of a liquid crystal display device. The test data is shown in the Table below:

TABLE 13

Formulation of the liquid crystal composition and its test performance

| Code of component | No. of compound | Content percentage | Test results for the performance parameters | |
|---|---|---|---|---|
| 3PGUQUF | I-1-2 | 5 | Δn | 0.107 |
| 4PGUQUF | I-1-3 | 4 | Δε | 8.5 |
| 3PGUQPOCF3 | I-1-9 | 4 | Cp | 86.4 |
| 4PGUQPOCF3 | I-1-10 | 4 | γ1 | 67 |
| 3PGUQPCF3 | I-1-6 | 4 | $K_{11}$ | 12.4 |
| 4PGUQPCF3 | I-1-7 | 4 | $K_{33}$ | 14.8 |
| 3PPUQUF | I-2-15 | 3 | LTS (bottle at −25° C.) | >1000 h |
| 3CCP1 | V-3 | 8 | LTS (bottle at −30° C.) | >1000 h |
| VCCP1 | V-3 | 10 | VHR (initial) | 98.0 |
| 3CCV | II-6 | 40 | VHR (high temperature) | 97.8 |
| 3CCV1 | II-7 | 8 | | |
| 5CPO2 | V-1 | 6 | | |
| Total | | 100 | | |

Example 13

The liquid crystal composition of Example 13 is prepared according to each compound and weight percentage listed in Table 14, and then tested by filling the same between two substrates of a liquid crystal display device. The test data is shown in the Table below:

TABLE 14

Formulation of the liquid crystal composition and its test performance

| Code of component | No. of compound | Content percentage | Test results for the performance parameters | |
|---|---|---|---|---|
| 3PGUQPOCF3 | I-I-9 | 3 | Δn | 0.109 |
| 4PGUQPOCF3 | I-I-10 | 2 | Δε | 11.3 |
| 2PGUQPCF3 | I-I-5 | 2 | Cp | 85 |
| 3PGUQPCF3 | I-I-6 | 3 | γ1 | 78 |
| 2APUQUF | I-2-7 | 4 | $K_{11}$ | 14.3 |
| 3APUQUF | I-2-8 | 4 | $K_{33}$ | 15 |
| 3CPUQUF | I-2-2 | 7 | LTS (bottle at −25° C.) | >1000 h |
| 3IUQUF | IV-2 | 8 | LTS (bottle at −30° C.) | >1000 h |
| 3CCUF | III-I-6 | 8 | VHR (initial) | 97.5 |
| 4CCUF | III-I-7 | 7 | VHR (high temperature) | 97.2 |
| 2CCPUF | III-3-1 | 4 | | |
| 3CCPUF | III-3-2 | 4 | | |
| 5CPGF | III-2-3 | 3 | | |
| 3CCV | II-6 | 33 | | |
| 3CC2 | II-2 | 4 | | |
| 4PGPF | V-3 | 2 | | |
| 3PGPC2 | V-8 | 2 | | |
| Total | | 100 | | |

Example 14

The liquid crystal composition of Example 14 is prepared according to each compound and weight percentage listed in Table 15, and then tested by filling the same between two substrates of a liquid crystal display device. The test data is shown in the Table below:

TABLE 15

Formulation of the liquid crystal composition and its test performance

| Code of component | No. of compound | Content percentage | Test results for the performance parameters | |
|---|---|---|---|---|
| 2PGUQPOCF3 | I-1-8 | 3 | Δn | 0.096 |
| 3PGUQPOCF3 | I-1-9 | 4 | Δε | 11.8 |
| 2PGUQPCF3 | I-1-5 | 3 | Cp | 75.2 |
| 3PGUQPCF3 | I-1-6 | 4 | γ1 | 84 |
| 2DPUQUF | I-2-7 | 5 | $K_{11}$ | 14 |
| 3DPUQUF | I-2-8 | 5 | $K_{33}$ | 15.5 |
| 2IUQUF | IV-1 | 6 | LTS (bottle at −25° C.) | >1000 h |
| 3IUQUF | IV-2 | 8 | LTS (bottle at −30° C.) | >1000 h |
| 2CCGF | III-1-1 | 4 | VHR (initial) | 97.7 |
| 3CCGF | III-1-2 | 6 | VHR (high temperature) | 97.4 |
| 4CCGF | III-1-3 | 6 | | |
| 5CCGF | III-1-4 | 5 | | |
| 3CCV | II-6 | 25 | | |
| 4CC3 | II-3 | 8 | | |
| 5CC2 | II-4 | 8 | | |
| Total | | 100 | | |

Example 15

The liquid crystal composition of Example 15 is prepared according to each compound and weight percentage listed in Table 16, and then tested by filling the same between two substrates of a liquid crystal display device. The test data is shown in the Table below:

TABLE 16

Formulation of the liquid crystal composition and its test performance

| Code of component | No. of compound | Content percentage | Test results for the performance parameters | |
|---|---|---|---|---|
| 2PGUQUF | I-1-1 | 5 | Δn | 0.116 |
| 3PGUQUF | I-1-2 | 5 | Δε | 13.2 |
| 4PGUQUF | I-1-3 | 5 | Cp | 82.5 |
| 2PGUQPOCF3 | I-1-8 | 5 | γ1 | 93 |
| 3PGUQPOCF3 | I-1-9 | 5 | $K_{11}$ | 13.5 |
| 4PGUQPOCF3 | I-1-10 | 5 | $K_{33}$ | 14.5 |
| 2IUQUF | IV-1 | 6 | LTS (bottle at −25° C.) | >1000 h |
| 3IUQUF | IV-2 | 6 | LTS (bottle at −30° C.) | >1000 h |
| 3CCGF | III-1-2 | 8 | VHR (initial) | 97.3 |
| 4CCGF | III-1-3 | 7 | VHR (high temperature) | 96.8 |
| 2CCPOCF3 | III-1-9 | 6 | | |
| 3CCPOCF3 | III-1-10 | 7 | | |
| 3CCV | II-6 | 20 | | |
| 3CC2 | II-2 | 6 | | |
| 5CC3 | II-5 | 4 | | |
| Total | | 100 | | |

Example 16

The liquid crystal composition of Example 16 is prepared according to each compound and weight percentage listed in Table 17, and then tested by filling the same between two substrates of a liquid crystal display device. The test data is shown in the Table below:

TABLE 17

Formulation of the liquid crystal composition and its test performance

| Code of component | No. of compound | Content percentage | Test results for the performance parameters | |
|---|---|---|---|---|
| 2PGUQUF | I-1-1 | 6 | Δn | 0.114 |
| 3PGUQUF | I-1-2 | 6 | Δε | 9.2 |
| 4PGUQUF | I-1-3 | 6 | Cp | 71.4 |
| 3PGUQPCF3 | I-1-6 | 3 | γ1 | 72 |
| 4PGUQPCF3 | I-1-7 | 3 | $K_{11}$ | 13 |
| 3IUQUF | IV-2 | 4 | $K_{33}$ | 14.3 |
| 3CCP1 | V-3 | 5 | LTS (bottle at −25° C.) | >1000 h |
| 3CCP3 | V-3 | 5 | LTS (bottle at −30° C.) | >1000 h |
| 3CPP2 | V-4 | 5 | VHR (initial) | 97.9 |
| 3CCV | II-6 | 35 | VHR (high temperature) | 97.7 |
| 5CCV | II-9 | 6 | | |
| 3CPO2 | V-1 | 8 | | |
| 3PP2 | V-2 | 6 | | |
| 3PGPF | V-5 | 2 | | |
| Total | | 100 | | |

Example 17

The liquid crystal composition of Example 17 is prepared according to each compound and weight percentage listed in Table 18, and then tested by filling the same between two substrates of a liquid crystal display device. The test data is shown in the Table below:

TABLE 18

Formulation of the liquid crystal composition and its test performance

| Code of component | No. of compound | Content percentage | Test results for the performance parameters | |
|---|---|---|---|---|
| 3PGUQUF | I-1-2 | 7 | Δn | 0.112 |
| 4PGUQUF | I-1-3 | 7 | Δε | 12.31 |
| 2PGUQPCF3 | I-1-5 | 6 | Cp | 76.9 |
| 3PGUQPCF3 | I-1-6 | 7 | γ1 | 85 |
| 3CPUQUF | I-2-2 | 2 | $K_{11}$ | 14.1 |
| 3DUQUF | IV-7 | 3 | $K_{33}$ | 15.2 |
| 3AUQUF | IV-4 | 3 | LTS (bottle at −25° C.) | >1000 h |
| 3CCPUF | III-3-2 | 3 | LTS (bottle at −30° C.) | >1000 h |
| 5CCPUF | III-3-4 | 2 | VHR (initial) | 97.2 |
| 3CPUF | III-2-5 | 11 | VHR (high temperature) | 97.0 |
| 5CPUF | III-2-7 | 5 | | |
| 3CCV | II-6 | 24 | | |
| 3CC2 | II-2 | 12 | | |
| 4CC3 | II-3 | 8 | | |
| Total | | 100 | | |

Example 18

The liquid crystal composition of Example 18 is prepared according to each compound and weight percentage listed in Table 19, and then tested by filling the same between two substrates of a liquid crystal display device. The test data is shown in the Table below:

TABLE 19

Formulation of the liquid crystal composition and its test performance

| Code of component | No. of compound | Content percentage | Test results for the performance parameters | |
|---|---|---|---|---|
| 2PGUQUF | I-1-1 | 3 | Δn | 0.116 |
| 3PGUQUF | I-1-2 | 3 | Δε | 10.4 |
| 4PGUQUF | I-1-3 | 3 | Cp | 84 |
| 2PGUQPOCF3 | I-1-8 | 6 | γ1 | 74 |
| 3PGUQPOCF3 | I-1-9 | 8 | $K_{11}$ | 13.8 |
| 4PGUQPOCF3 | I-1-10 | 7 | $K_{33}$ | 14.9 |
| 3CCGF | III-1-2 | 6 | LTS (bottle at −25° C.) | >1000 h |
| 4CCGF | III-1-3 | 6 | LTS (bottle at −30° C.) | >1000 h |
| 2CCPOCF3 | III-1-9 | 5 | VHR (initial) | 97.5 |
| 3CCV | II-6 | 39 | VHR (high temperature) | 97.2 |
| 4CCV | II-8 | 6 | | |
| 3PGPF | V-5 | 3 | | |
| 4PGPF | V-5 | 3 | | |
| 5PGPF | V-5 | 2 | | |
| Total | | 100 | | |

It can be seen from the test data of the above Examples that the liquid crystal composition provided by the present invention has appropriately high optical anisotropy, higher optical anisotropy, lower threshold voltage, suitable temperature range of nematic phase, suitable elastic constant, lower viscosity, good reliability and heat stability, and good low-temperature intersolubility, and is applicable to IPS, TN-TFT liquid crystal displays.

What is claimed is:

1. A liquid crystal composition comprising:
(a) 15-30% by weight of the total amount of the liquid crystal composition of three or more compounds of general formula I

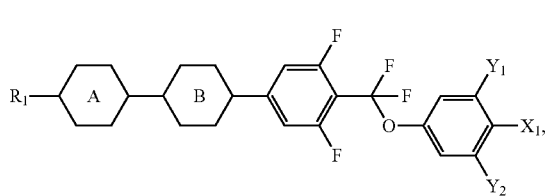

in which,
$R_1$ represents $C_{1-5}$ alkyl or alkoxy, or $C_{2-5}$ alkenyl or alkenoxy;
$Y_1$ and $Y_2$ are same or different, and each independently represents H, F, or methyl or methoxyl which is with or without halogen substituent;

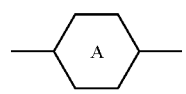

is selected from a group consisting of

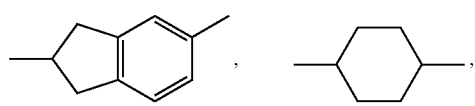

-continued

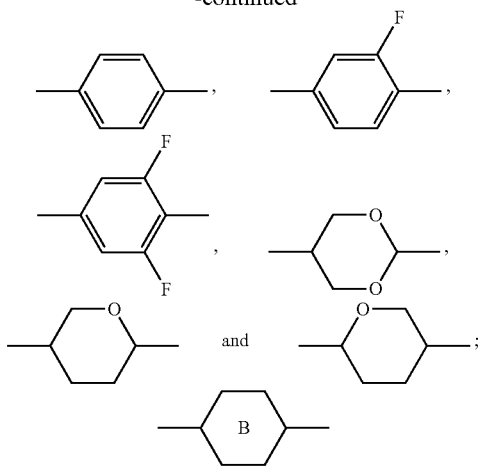

is selected from a group consisting of

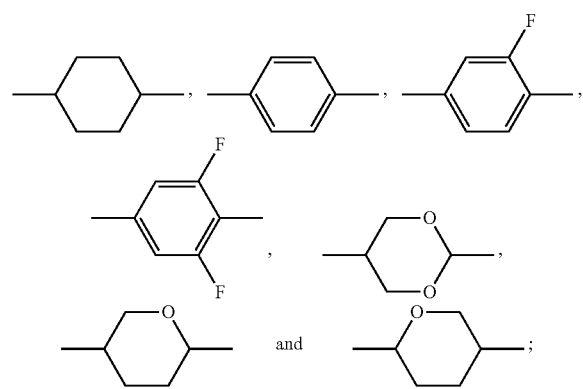

$X_1$ represents F, Cl, or $C_{1-5}$ alkyl or alkoxy which is with or without halogen substituent;

wherein the three or more compounds of general formula I comprise at least two compounds of general formula I-1,

I-1

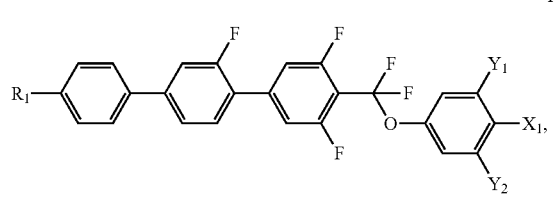

$R_1$, $Y_1$, $Y_2$ and $X_1$ are as defined in general formula I;

wherein the total amount of the at least two compounds of general formula I-1 comprise no lower than 10% by weight of the total amount of the liquid crystal composition, and the content of each of the compounds of general formula I-1 is no higher than 8%;

(b) 6-19% by weight of the total amount of the liquid crystal composition of at least one compound selected from the group consisting of compounds of general formula IV-1, compounds of general formula IV-2, and compounds of general formula IV-3:

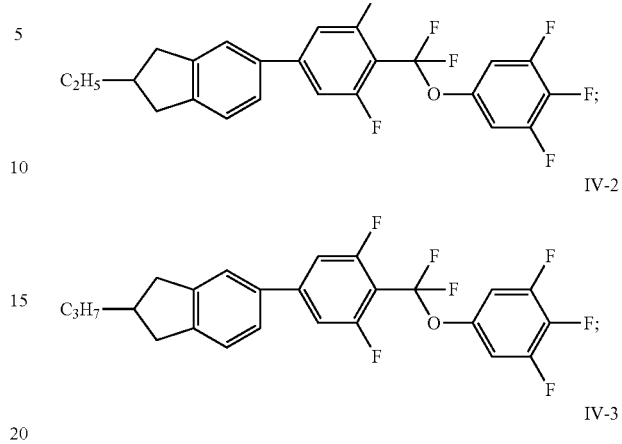

and (c) one or more stabilizers selected from the group consisting of:

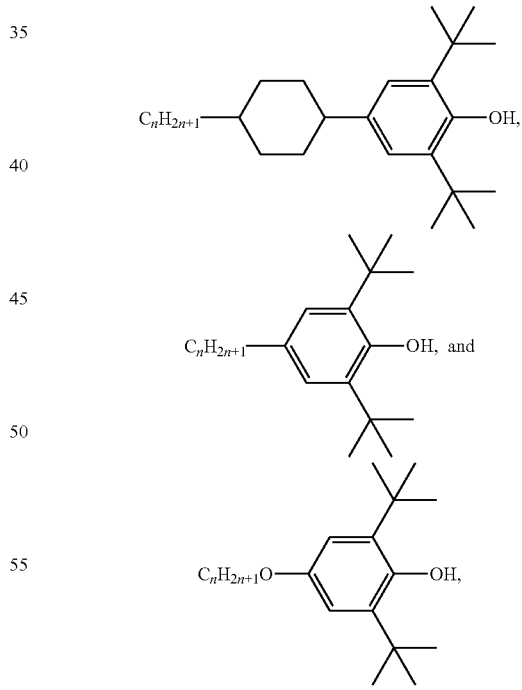

wherein n=3; and wherein the liquid crystal composition has a dielectric constant anisotropy (Δε) from 11 to 13.5.

2. The liquid crystal composition according to claim 1, wherein the three or more compounds of general formula I comprise:

10-30% by weight of the total amount of the liquid crystal composition of at least two compounds of general formula I-1

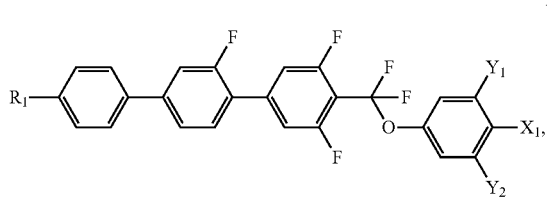

and 0-15% by weight of the total amount of the liquid crystal composition of at least one compound of general formula I-2

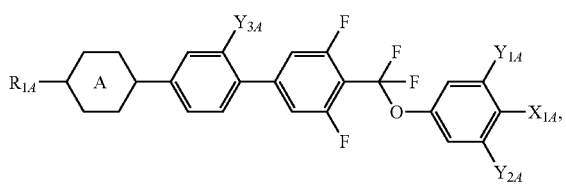

in which, $R_1$ and $R_{1A}$ are same or different, and each independently represents $C_{1-5}$ alkyl or alkoxy, or $C_{2-5}$ alkenyl or alkenoxy;

$Y_1$, $Y_2$, $Y_{1A}$ and $Y_{2A}$ are same or different, and each independently represents H, F, or methyl or methoxyl which is with or without halogen substituent;

$Y_{3A}$ represents H or F;

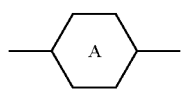

is selected from a group consisting of

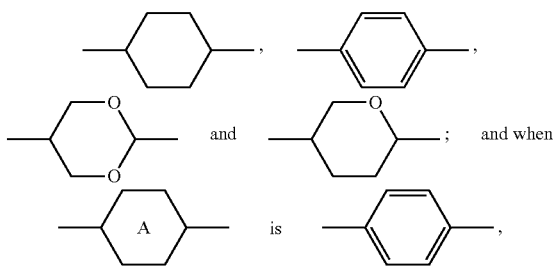

$Y_{3A}$ represents H;

$X_1$ and $X_{1A}$ are same or different, and each independently represents F, Cl, or $C_{1-5}$ alkyl or alkoxy which is with or without halogen substituent.

3. The liquid crystal composition according to claim 2, wherein the $R_1$ and the $R_{1A}$ are same or different, and each independently represents $C_{1-5}$ alkyl, $Y_1$, $Y_2$, $Y_{1A}$, $Y_{2A}$ and $Y_{3A}$ are same or different, and each independently is H or F; $X_1$ and $X_{1A}$ are same or different, and each independently represents F, $CF_3$ or $OCF_3$.

4. The liquid crystal composition according to claim 1, wherein the liquid crystal composition further comprises:

10-50% by weight of the total amount of the liquid crystal composition of one or more compounds of general formula II

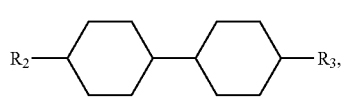

in which, $R_2$ and $R_3$ are same or different, and each independently represents $C_{1-5}$ alkyl or alkoxy, or $C_{2-5}$ alkenyl or alkenoxy.

5. The liquid crystal composition according to claim 4, wherein the liquid crystal composition further comprises:

0-50% by weight of the total amount of the liquid crystal composition of one or more compounds selected from a group consisting of compounds of general formula III-1, general formula III-2 and general formula III-3

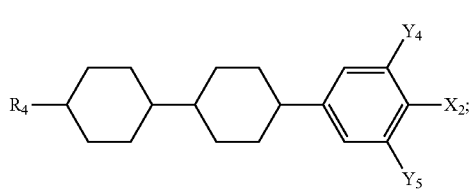

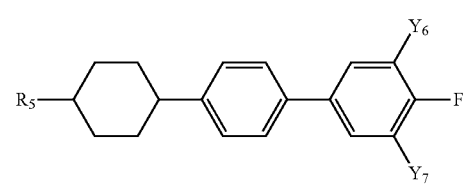

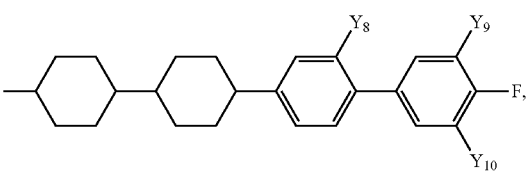

in which, $R_4$, $R_5$ and $R_6$ are same or different, and each independently represents $C_{1-5}$ alkyl or alkoxy, or $C_{2-5}$ alkenyl or alkenoxy;

$Y_4$, $Y_5$, $Y_6$, $Y_7$, $Y_8$, $Y_9$ and $Y_{10}$ are same or different, and each independently is H, F, or methyl or methoxyl which is with or without halogen substituent;

$X_2$ represents F, Cl, or $C_{1-5}$ alkyl or alkoxy which is with or without halogen substituent.

6. The liquid crystal composition according to claim 2, wherein the compound of general formula I-1 is selected from a group consisting of the following compounds:

I-1-1
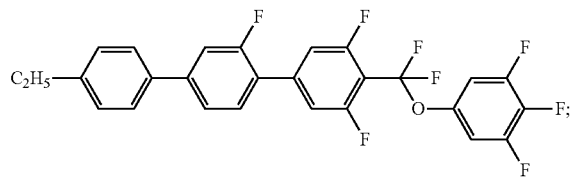
I-1-2
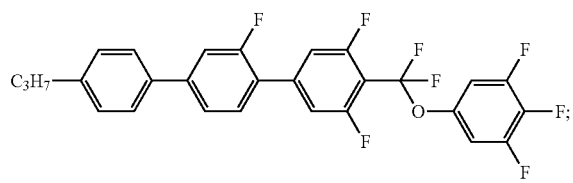
I-1-3
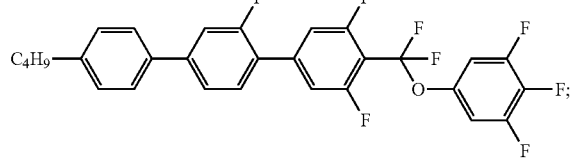
I-1-4
I-1-5
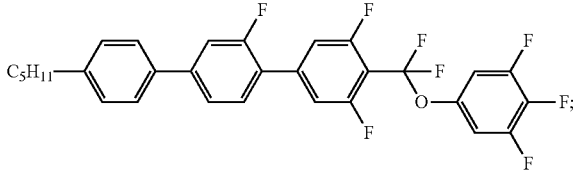
I-1-6
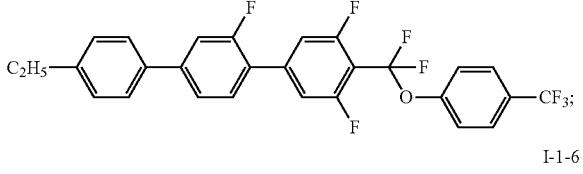
I-1-7
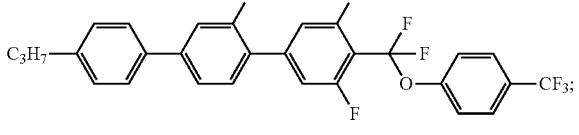
I-1-8
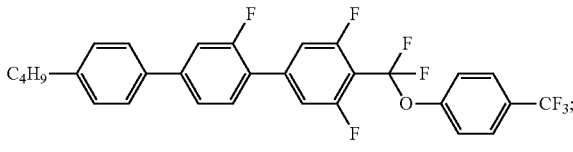
I-1-9
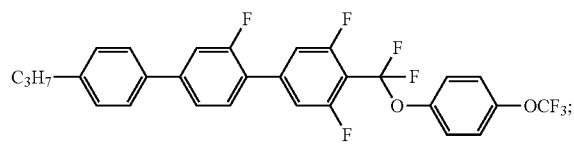
I-1-10
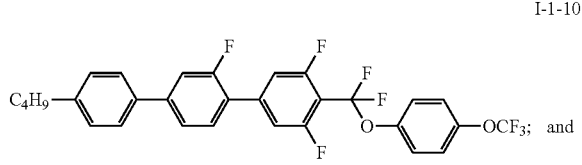
I-1-11
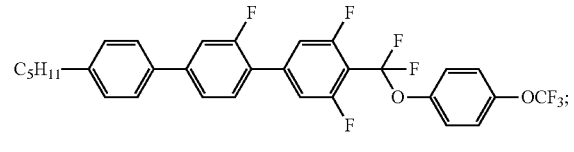
and
the compound of general formula I-2 is selected from a group consisting of the following compounds:
I-2-1
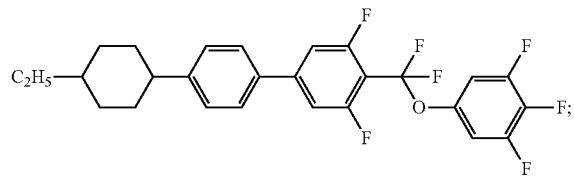
I-2-2
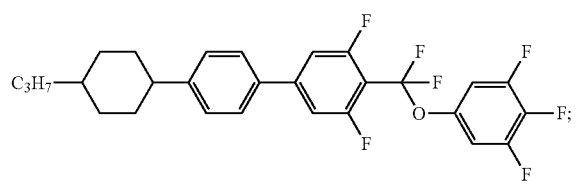
I-2-3
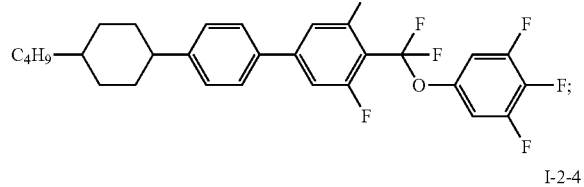
I-2-4
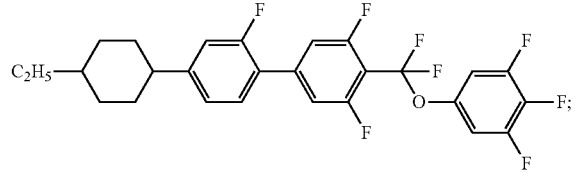

-continued
I-2-5
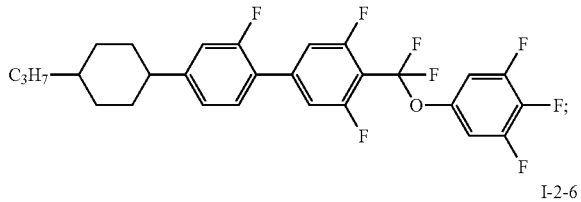
I-2-6
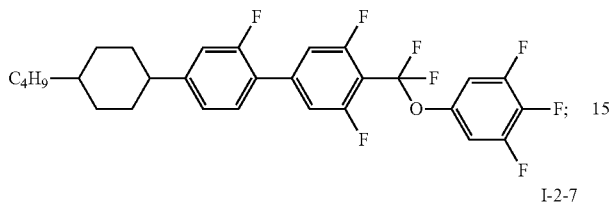
I-2-7
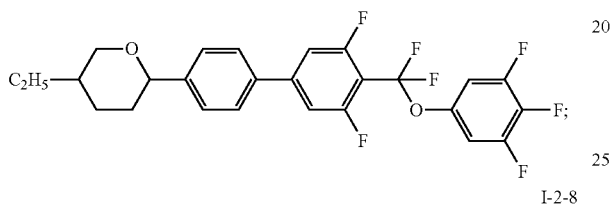
I-2-8
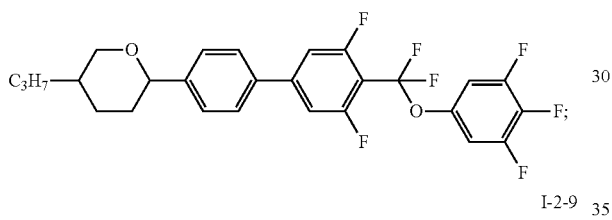
I-2-9
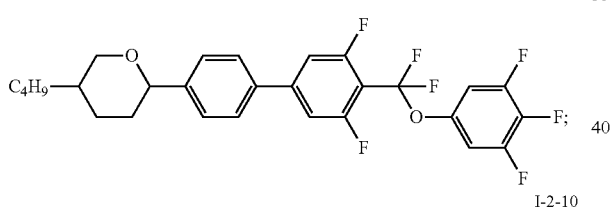
I-2-10
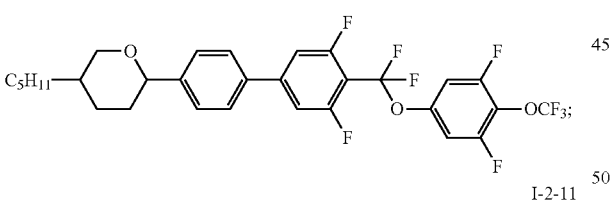
I-2-11
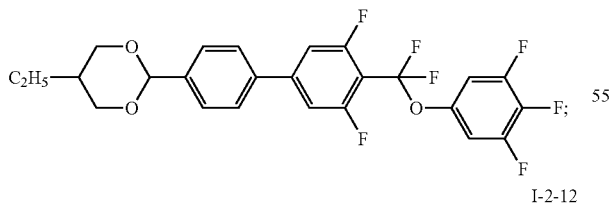
I-2-12
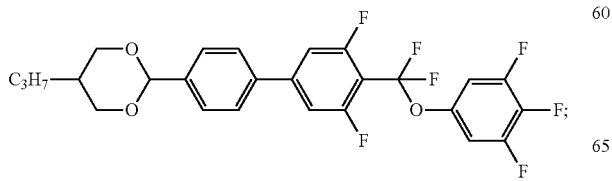
-continued
I-2-13
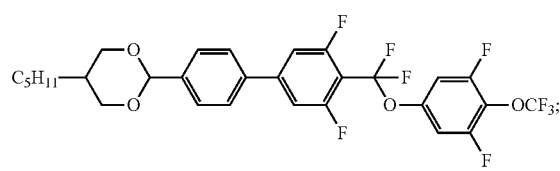
I-2-14
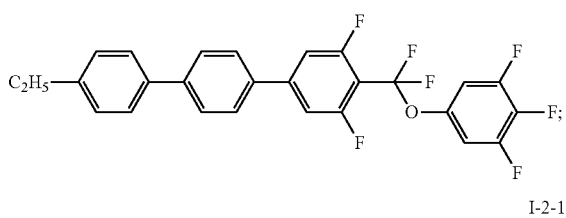
I-2-15
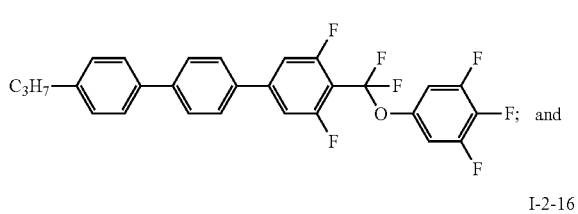
I-2-16
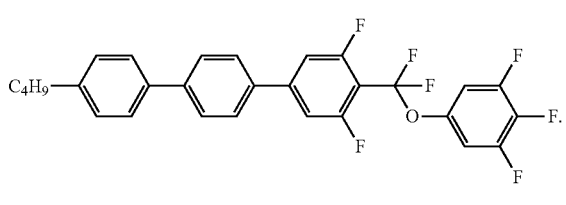
7. The liquid crystal composition according to claim 4, wherein the compound of general formula II is selected from a group consisting of the following compounds:
II-1
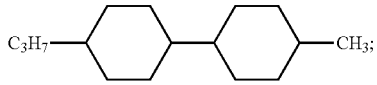
II-2
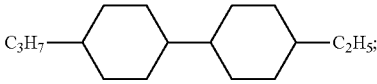
II-3
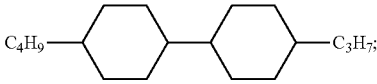
II-4
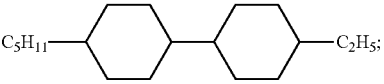
II-5
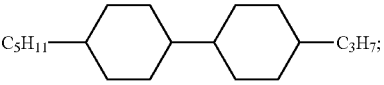
II-6
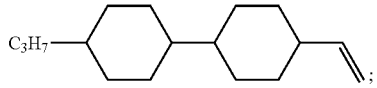

-continued
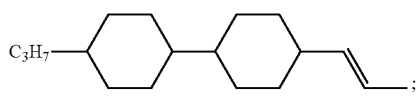 II-7
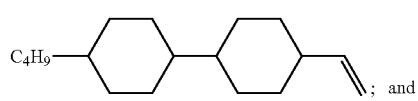 II-8
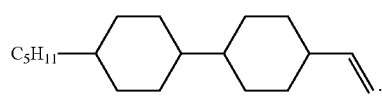 II-9
8. The liquid crystal composition according to claim 5, wherein the compound of general formula III-1 is selected from a group consisting of the following compounds:
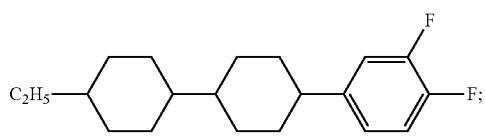 III-1-1
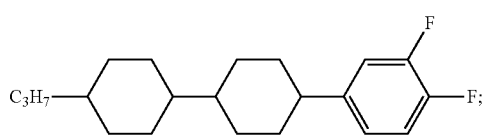 III-1-2
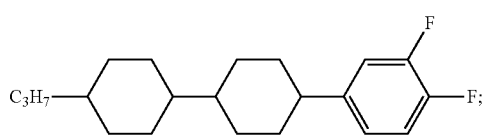 III-1-3
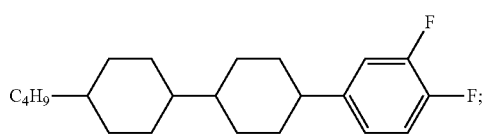 III-1-4
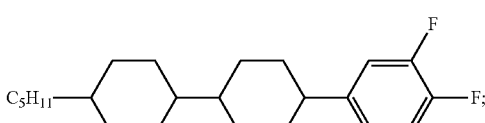 III-1-5
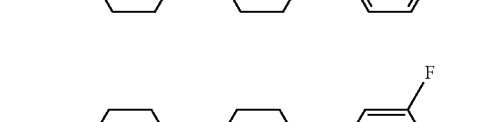 III-1-6
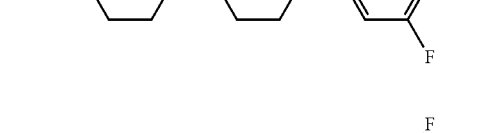 III-1-7
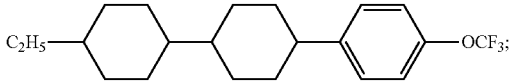 III-1-8
 III-1-9
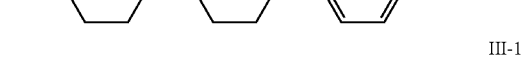 III-1-10
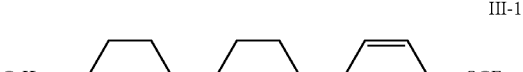 III-1-11; and
 III-1-12
the compound of general formula III-2 is selected from a group consisting of the following compounds:
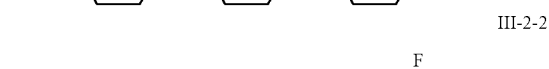 III-2-1
 III-2-2
III-2-3

III-2-4
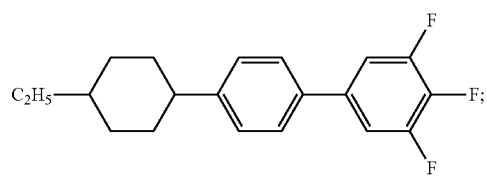
III-2-5
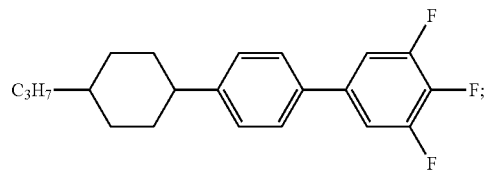
III-2-6
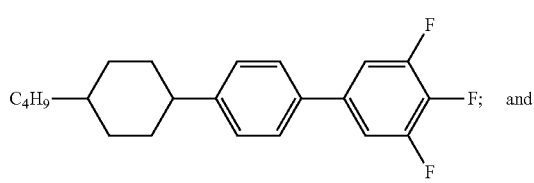 and
III-2-7
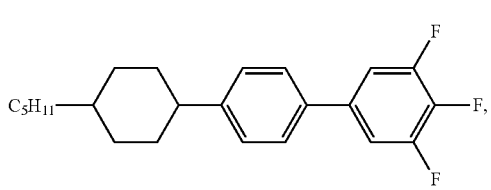
and
the compound of general formula III-3 is selected from a group consisting of the following compounds:
III-3-1
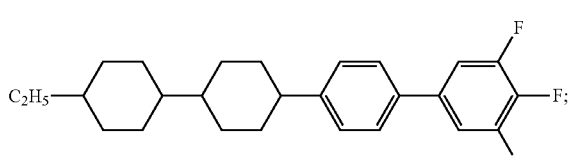
III-3-2
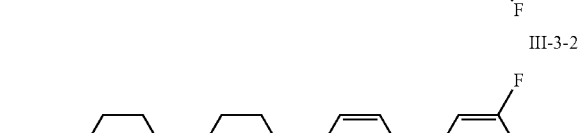
III-3-3
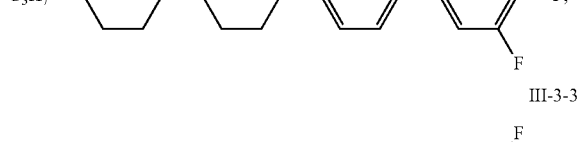
III-3-4
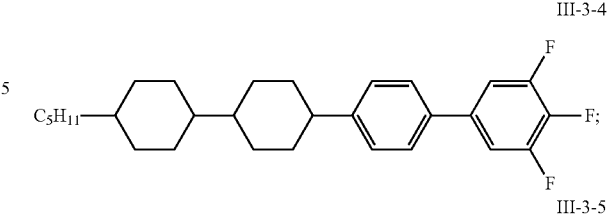
III-3-5
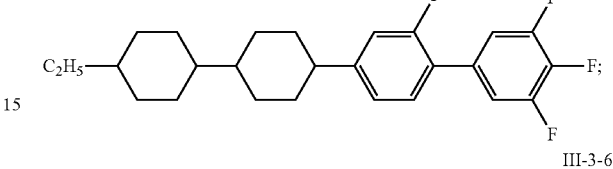
III-3-6
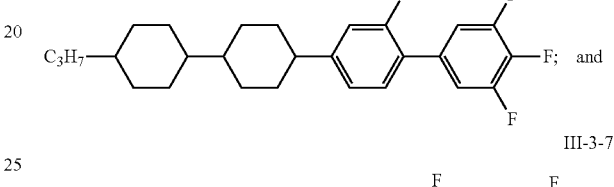 and
III-3-7
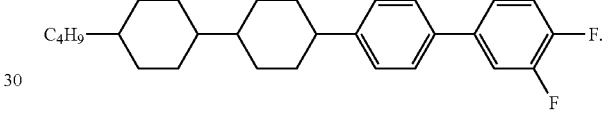
9. The liquid crystal composition according to claim 5, wherein the liquid crystal composition further comprises one or more compounds selected from a group consisting of the following compounds:
IV-4
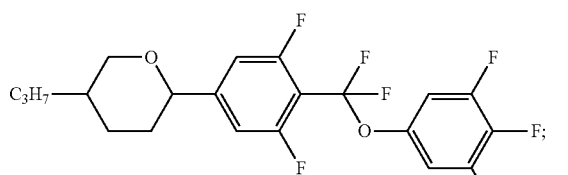
IV-5
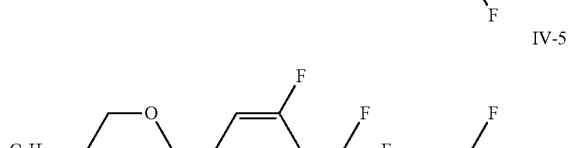
IV-6
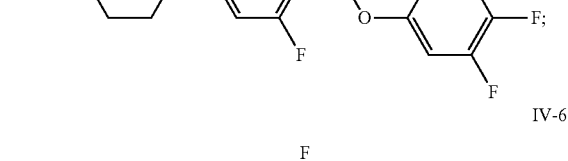

-continued

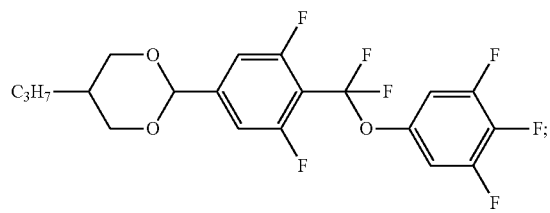
IV-7

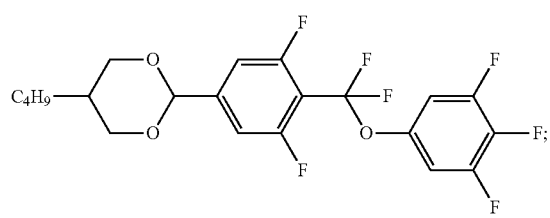
IV-8

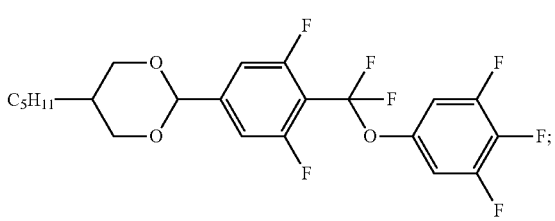
IV-9

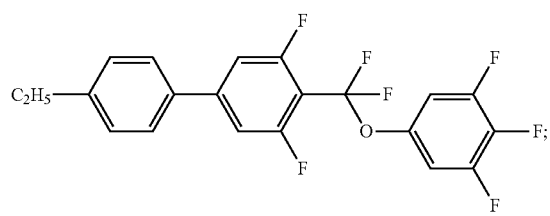
IV-10

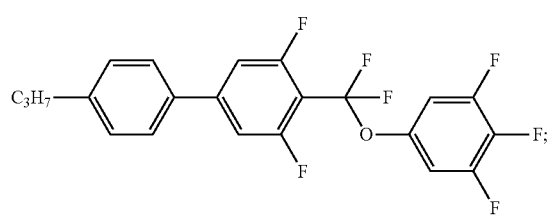
IV-11

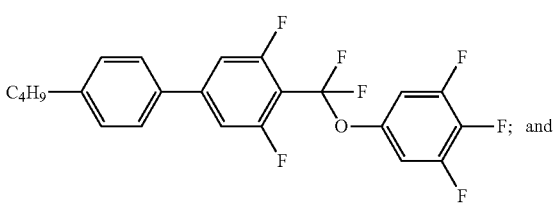
IV-12

-continued

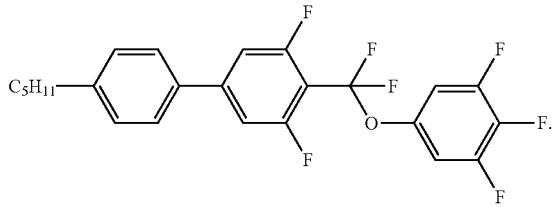
IV-13

10. The liquid crystal composition according to claim 5, wherein the liquid crystal composition further comprises:
0-40% by weight of the total amount of the liquid crystal composition of one or more compounds selected from a group consisting of compounds of formula V-1 to formula V-8

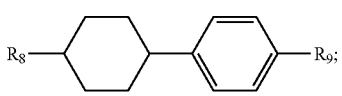
V-1

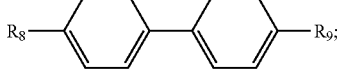
V-2

V-3

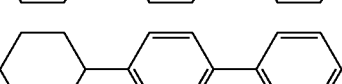
V-4

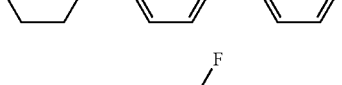
V-5

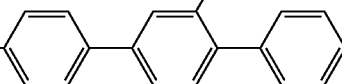
V-6

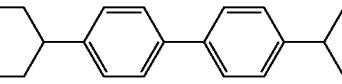
V-7

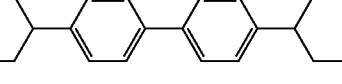
V-8 in which,
$R_8$ and $R_9$ are same or different, and each independently represents $C_{1-5}$ alkyl or alkoxy, or $C_{2-5}$ alkenyl or alkenoxy.

11. The liquid crystal composition according to claim 1, wherein the liquid crystal composition further comprises one or more additives.

12. A liquid crystal display device comprising the liquid crystal composition of claim 1.

* * * * *